(12) United States Patent
Karaki et al.

(10) Patent No.: US 6,512,772 B1
(45) Date of Patent: Jan. 28, 2003

(54) ATM-ADDRESS RESOLVING TRANSMISSION APPARATUS

(75) Inventors: Natsuki Karaki, Machida (JP); Katsunobu Okuda, Kawasaki (JP); Yukio Shimamoto, Yokohama (JP); Kei Toga, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/249,117

(22) Filed: Feb. 12, 1999

(30) Foreign Application Priority Data

Feb. 12, 1998 (JP) .......................................... 10-029357

(51) Int. Cl.$^7$ ............................................. H04L 12/56
(52) U.S. Cl. ................................... 370/395.5; 370/466
(58) Field of Search ................................ 370/389, 392, 370/395, 397, 399

(56) References Cited

U.S. PATENT DOCUMENTS

| | | | | |
|---|---|---|---|---|
| 5,485,455 A | * | 1/1996 | Dobbins et al. | 370/400 |
| 5,491,694 A | * | 2/1996 | Oliver et al. | 364/242 |
| 5,715,250 A | * | 2/1998 | Watanabe | 370/395 |
| 5,774,662 A | * | 6/1998 | Sakagawa | 395/412 |
| 5,790,546 A | * | 8/1998 | Dobbins et al. | 370/400 |
| 5,889,777 A | * | 3/1999 | Miyao et al. | 370/345 |
| 6,081,836 A | * | 6/2000 | Karapetkov et al. | 709/218 |
| 6,128,303 A | * | 10/2000 | Bergantino et al. | 370/398 |
| 6,157,636 A | * | 10/2000 | Voit et al. | 370/353 |
| 6,172,981 B1 | * | 1/2001 | Cox et al. | 370/401 |
| 6,169,739 B1 | * | 2/2001 | Isoyama | 370/395 |
| 6,226,267 B1 | * | 5/2001 | Spinney et al. | 370/235 |
| 6,304,912 B1 | * | 10/2001 | Oguchi et al. | 709/238 |

OTHER PUBLICATIONS

"ATM–Switch Network Bible with Explanatory Diagrams" Ohm Corporation p. 111–115.

* cited by examiner

*Primary Examiner*—Hassan Kizou
*Assistant Examiner*—Lu Yin
(74) *Attorney, Agent, or Firm*—Antonelli, Terry, Stout & Kraus, LLP

(57) ABSTRACT

A transmission apparatus used for resolving an ATM address and provided between a terminating node communicating with another terminating node by using a layer-3 address and an ATM-switch network. A transmission apparatus includes a first apparatus which receives an ATM address of another transmission apparatus and a layer-3 address of a terminating node connected to another transmission apparatus from another transmission apparatus, and catalogs ATM address and layer-3 address into a table, and a second apparatus which searches the table using a layer-3 address of a destination terminating node which is a destination of a transmission of data received from a source terminating node connected to a transmission apparatus to acquire an ATM address of another transmission apparatus connected to destination terminating node, and communicates with another transmission apparatus by using the acquired ATM address to transmit a cell including information of a layer-3 address of destination terminating node.

28 Claims, 22 Drawing Sheets

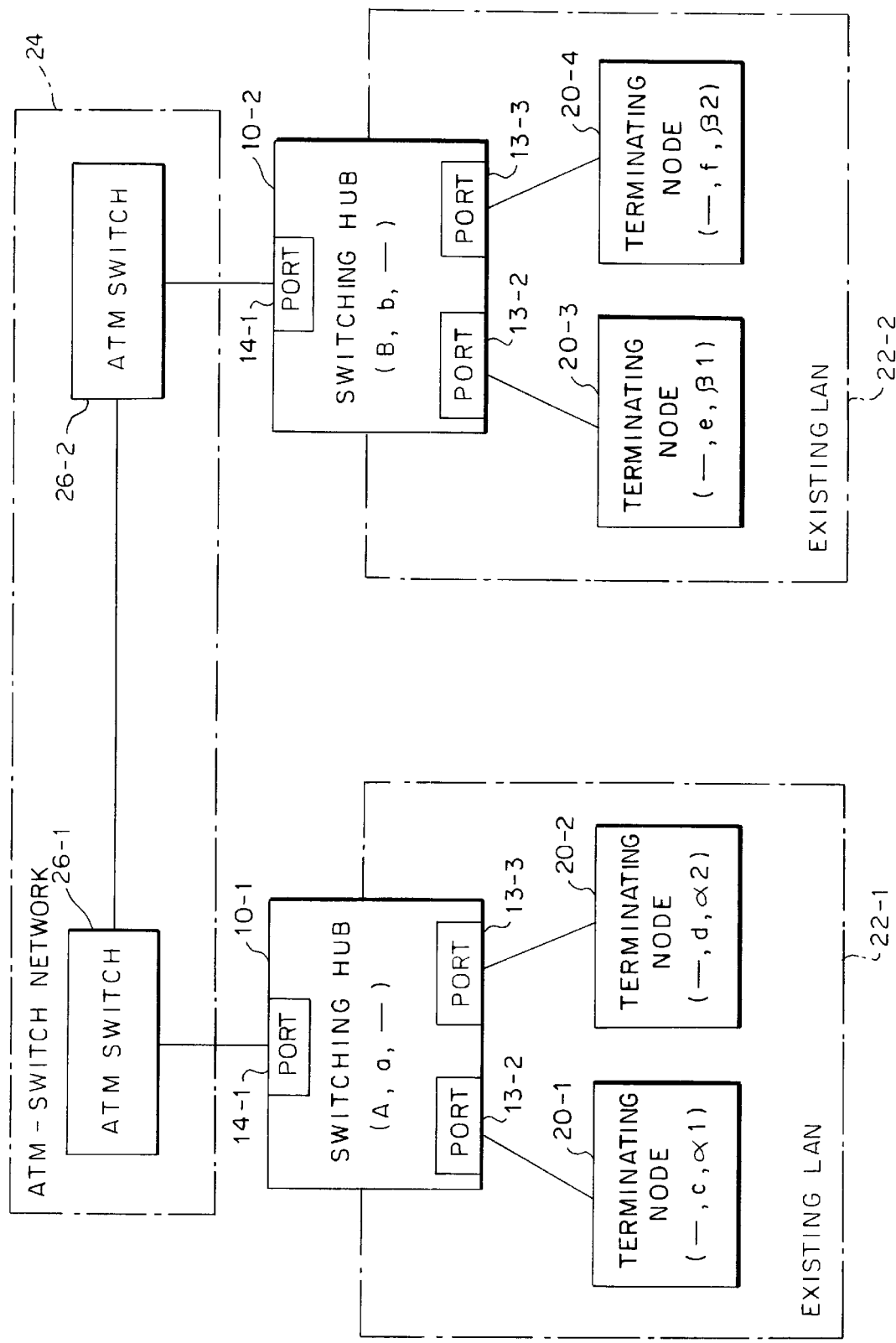

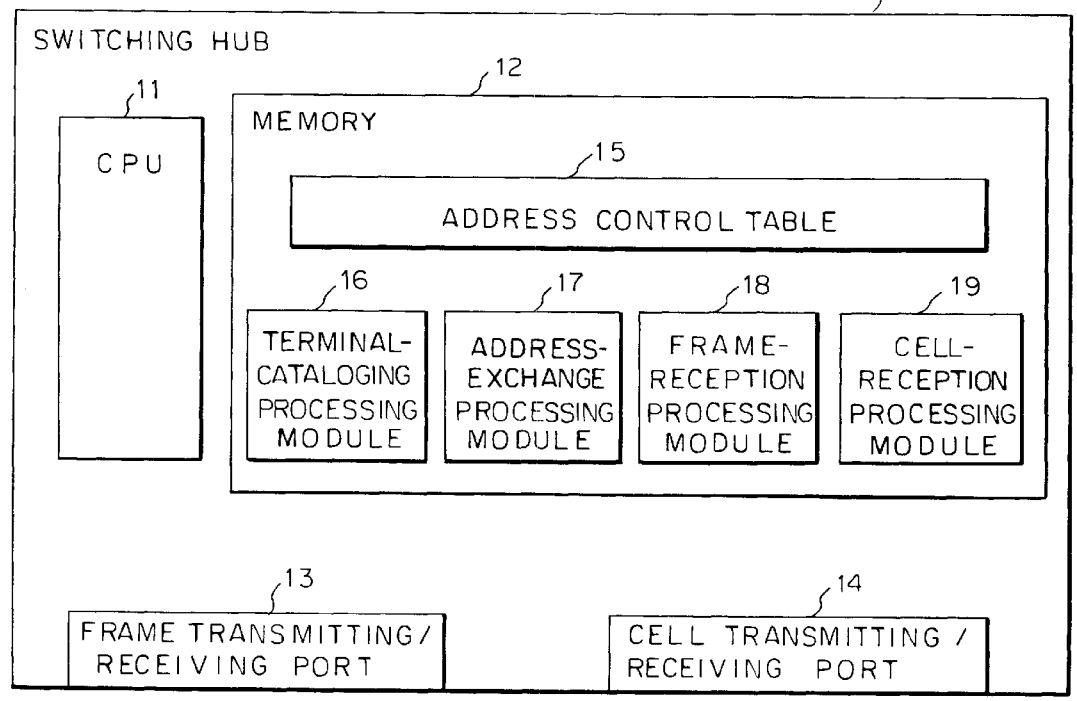

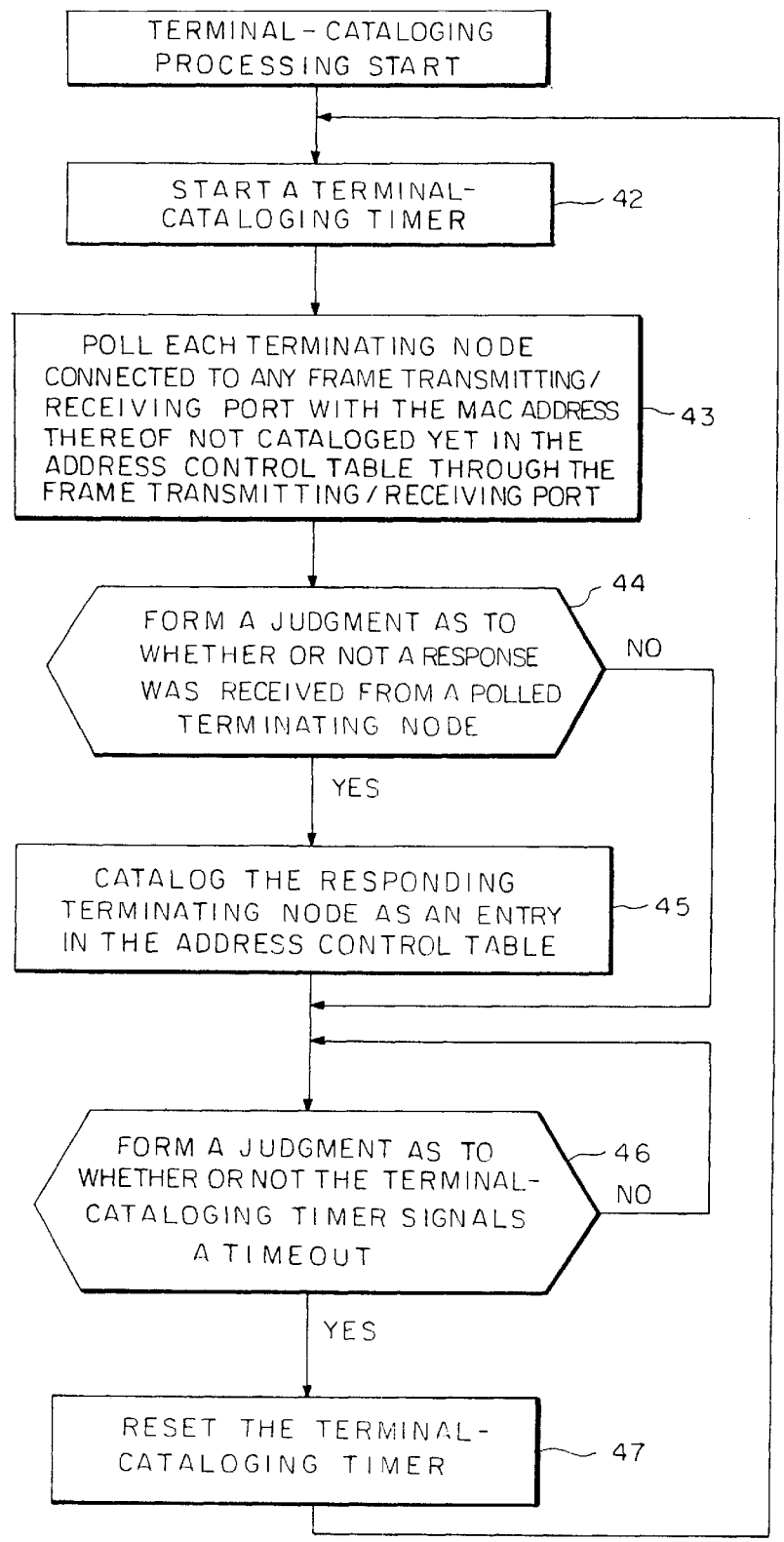

FIG. 5A

ADDRESS CONTROL TABLE OF THE SWITCHING HUB 10-1)

| ATM ADDRESS | MAC ADDRESS | LAYER-3 ADDRESS | CONNECTION PORT |
|---|---|---|---|
| − | c | α1 | 2 |
| − | d | α2 | 3 |

FIG. 5B

ADDRESS CONTROL TABLE OF THE SWITCHING HUB 10-2

| ATM ADDRESS | MAC ADDRESS | LAYER-3 ADDRESS | CONNECTION PORT |
|---|---|---|---|
| − | e | β1 | 2 |

FIG. 6

CELL HEADER (5 BYTES)   CELL DATA (48 BYTES)

| HEADER | ATM ADDRESS (20 BYTES) | MAC ADDRESS (6 BYTES) | LAYER-3 ADDRESS | PADDING |
|---|---|---|---|---|

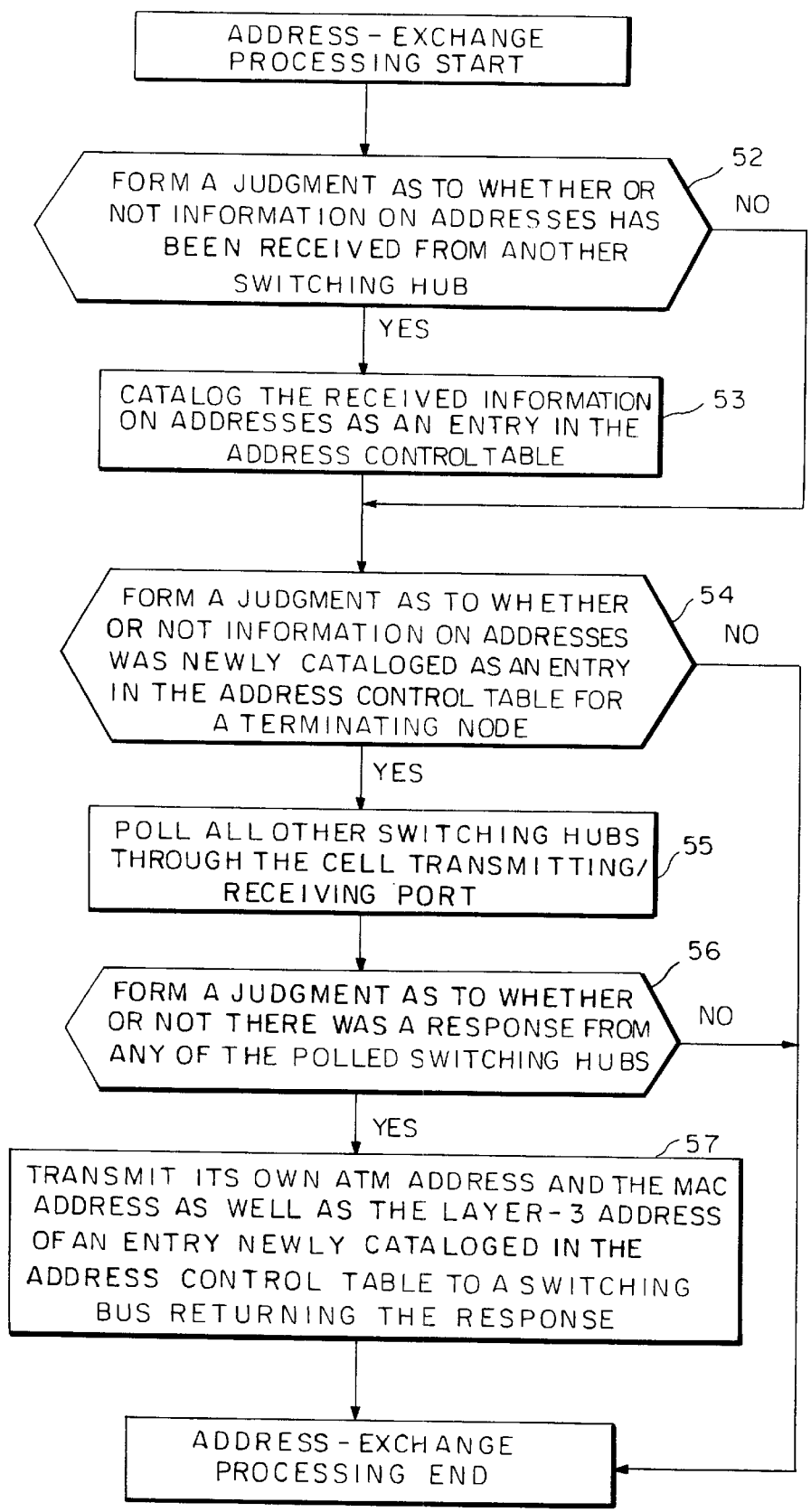

FIG. 8A
ADDRESS CONTROL TABLE OF THE SWITCHING HUB 10-1

| ATM ADDRESS | MAC ADDRESS | LAYER-3 ADDRESS | CONNECTION PORT |
|---|---|---|---|
| — | c | $\alpha 1$ | 2 |
| — | d | $\alpha 2$ | 3 |
| B | e | $\beta 1$ | 1 |

FIG. 8B
ADDRESS CONTROL TABLE OF THE SWITCHING HUB 10-2

| ATM ADDRESS | MAC ADDRESS | LAYER-3 ADDRESS | CONNECTION PORT |
|---|---|---|---|
| — | e | $\beta 1$ | 2 |
| A | c | $\alpha 1$ | 1 |
| A | d | $\alpha 2$ | 1 |

FIG. 9
ADDRESS CONTROL TABLE OF THE SWITCHING HUB 10-2

| ATM ADDRESS | MAC ADDRESS | LAYER-3 ADDRESS | CONNECTION PORT |
|---|---|---|---|
| — | e | $\beta 1$ | 2 |
| A | c | $\alpha 1$ | 1 |
| A | d | $\alpha 2$ | 1 |
| — | f | $\beta 2$ | 3 |

ADDRESS CONTROL TABLE OF THE SWITCHING HUB 10-1

| ATM ADDRESS | MAC ADDRESS | LAYER-3 ADDRESS | CONNECTION PORT |
|---|---|---|---|
| – | c | α1 | 2 |
| – | d | α2 | 3 |
| B | e | β1 | 1 |
| B | f | β2 | 1 |

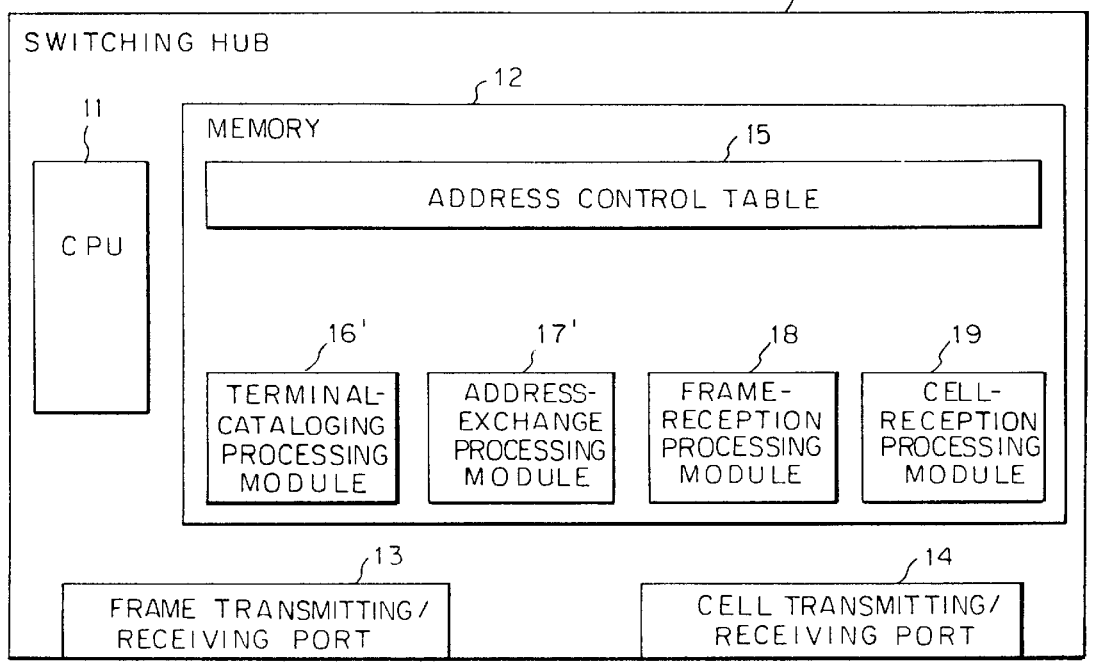
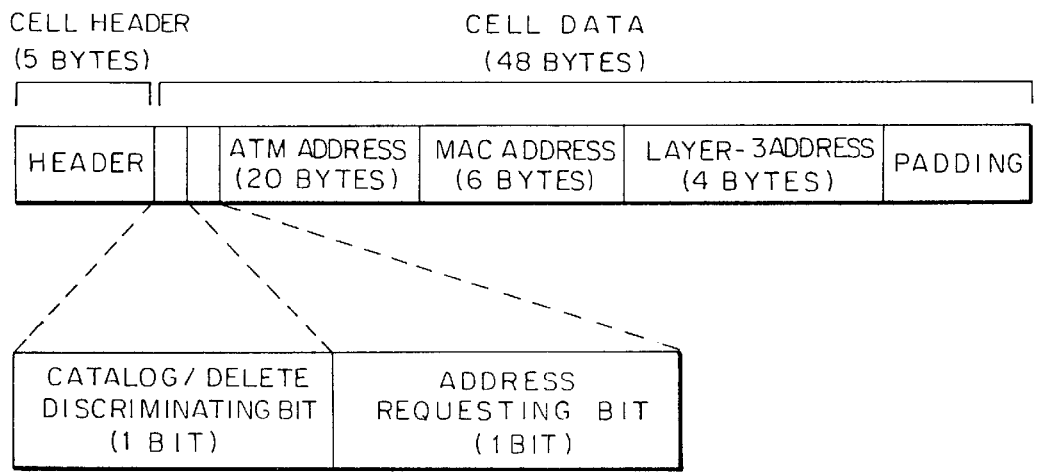

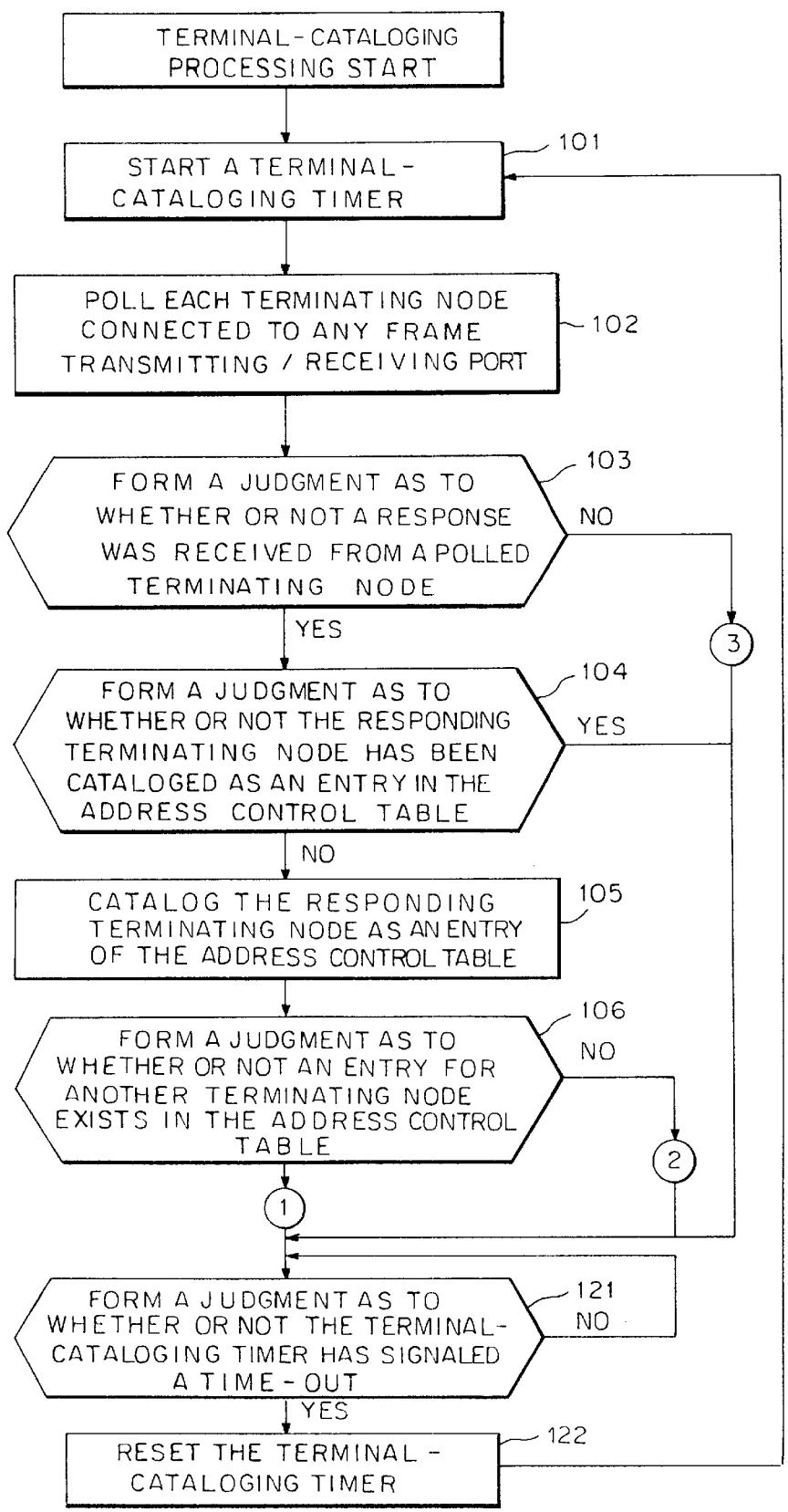

111 — SET A VALUE OF 1 IN THE CATALOG / DELETE DISCRIMINATING BIT OF THE ADDRESS-EXCHANGE CELL, A VALUE OF 1 IN THE ADDRESS REQUESTING BIT OF THE CELL, THE ATM ADDRESS OF THIS SWITCHING HUB IN THE ATM-ADDRESS FIELD OF THE CELL, THE CATALOGED MAC ADDRESS OF A TERMINATING NODE IN THE MAC-ADDRESS OF THE FIELD OF THE CELL AND THE CATALOGED LAYER-3 ADDRESS OF THE TERMINATING NODE IN THE LAYER-3 ADDRESS FIELD OF THE CELL

112 — POLL EACH SWITCHING HUB THROUGH THE CELL TRANSMITTING / RECEIVING PORT

113 — FORM A JUDGMENT AS TO WHETHER OR NOT A RESPONSE WAS RECEIVED FROM A POLLED SWITCHING HUB — NO

YES

114 — TRANSMIT THE ADDRESS-EXCHANGE CELL SET UP AT THE STEP 111 TO THE RESPONDING SWITCHING HUB

GO ON TO THE STEP 121

ATM-ADDRESS RESOLVING TRANSMISSION APPARATUS

TECHNICAL FIELD OF THE INVENTION

The present invention relates to a network system for transmitting data between terminating nodes through an Asynchronous Transmission Mode (ATM) switch network. More particularly, the present invention relates to a transmission apparatus provided between a terminating node and an ATM switch network to resolve an ATM address.

BACKGROUND OF THE INVENTION

As systems for connecting an existing (Local Area Network) (LAN) and an ATM switch, a LAN-emulation system and an Internet Protocal (IP) over-ATM system are available. The LAN-emulation system emulates an existing LAN such as the Ethernet and a token link to convert a MAC address on the existing LAN into an ATM address. The IP-over-ATM system is a system for converting an IP address on an IP network into an ATM address. The LAN-emulation system is described in "ATM-Switch Network Bible with Explanatory Diagrams" Ohm Corporation pg. 111–115. As for the IP-over-ATM system, such is described in Requests for Comments (RFC) 1577 and RFC 1755 by the Internet Engineering Task Force (IETF).

FIG. 18 is an explanatory diagram used for describing a technique adopted by the LAN-emulation system for resolving an address. As shown in FIG. 18, an ATM-switch network is connected to a variety of apparatuses including LECs LAN emulation clients (LECs) denoted by notations LEC-A, LEC-B and LEC-C in FIG. 18, an LECS (LAN emulation configuration server), a LAN emulation server (LECS) and a broadcast and unknown server (BUS). The LECS, LES and BUS are each a server for rendering services of resolving addresses. The LEC has an interface with an existing LAN and an ATM interface. Provided between an existing LAN and an ATM-switch network, the LEC is an apparatus playing the role of a bridge between the networks. An LEC composes an existing LAN in conjunction with terminating nodes.

LEC-A, an ATM end apparatus, acquires an ATM address of LEC-B by following a procedure described as follows. At step (1), in an initialization which is carried out when the power supply is turned on, LEC-A establishes a logical connection with the LECS for controlling the ATM address of the LES in order to acquire the ATM address of the LES. The LES controls an address control table, that is, a table associating the MAC address of each LEC with a corresponding ATM address. At step (2), when LEC-A receives a frame from a terminating node, LEC-A establishes a logical connection with the LES by using the ATM address of the LES acquired at step (1) to send the LES an inquiry about an ATM address of LEC-B, the data-transfer destination of the frame, on the basis of a destination MAC address of LEC-B described in the frame. If an ATM address of LEC-B associated with the MAC address of LEC-B is cataloged in the address control table in the LES, the LES transmits the ATM address of LEC-B in response to the inquiry at step (3). If an ATM address of LEC-B associated with the MAC address of LEC-B is not cataloged in the address control table of the LES, on the other hand, the LES sends the BUS an inquiry about the ATM address. Receiving this inquiry, the BUS sends all TECs connected to the ATM-switch network an inquiry about their ATM addresses by using a broadcasting technique at step (4). The BUS then transmits the ATM address of TEC-B obtained as a result of the broadcasted inquiry to the LES. Then, the LES catalogs the ATM address in the address control table, associating the ATM address with the MAC address of LEC-B. Subsequently, the LES transmits the ATM address of LEC-B to LEC-A. At step (5), LEC-A establishes a logical connection with LEC-B by using the received ATM address. LEC-A then generates cells from the frame received from the terminating node, transmitting the cells to LEC-B.

FIG. 19 is an explanatory diagram used for describing a technique adopted by the IP-over-ATM system to resolve an address. As shown in FIG. 19, the ATM-switch network is provided with an ATM-ARP (Address Resolution Protocol) server. Introduced between an existing LAN and the ATM-switch network, an ATM client plays the role of a router. ATM clients, namely, ATM clients A and B in the case of an example shown in FIG. 19, each compose an existing LAN in conjunction with terminating nodes.

ATM client A, an ATM end apparatus, acquires an ATM address of ATM client B by following a procedure described as follows. At step (1), in an initialization which is carried out when the power supply is turned on, ATM clients A and B each establish a logical connection with the ATM-ARP server. At that time, the ATM-ARP server sends ATM clients A and B an inquiry about their IP addresses and, in response to the inquiry, ATM clients A and B transmit their IP addresses to the ATM-ARP server. The ATM-ARP server creates an address control table, that is, a table associating an IP address of each ATM client with a corresponding ATM address. At step (2), when ATM client A receives a frame from a terminating node, ATM client A sends the ATM-ARP server an inquiry about an ATM address of ATM client B, the data-transfer destination of the frame, on the basis of a destination IP address of ATM client B described in the frame. At step (3), the ATM-ARP server searches the address control table for an ATM address of ATM client B with the IP address used as a key, transmitting the ATM address to ATM client A. At step (4), ATM client A establishes a logical connection with ATM client B by using the received ATM address. ATM client A then generates cells from the frame received from the terminating node, transmitting the cells to ATM client B.

As described above, in the LAN-emulation system, servers such as the LECS, the LES and the BUS are required in order to resolve an ATM address. In the case of the IP-over-ATM system, on the other hand, the ATM-ARP server is needed. In addition, when a failure occurs in one of these servers, an ATM address can not be resolved, giving rise to a problem that communications among ATM end apparatuses can not be carried out. Moreover, in order to resolve an ATM address, accesses are concentrated on a server, raising a problem of a long response time. Further, an ATM client of the IP-over-ATM system can not help carrying out processing by software due to intervention of communication with a server at a so-called Internet layer in the TCP/IP protocol system. As a result, the performance deteriorates due to an overhead entailed by the processing by software.

SUMMARY OF THE INVENTION

An object of the present invention is to provide an ATM apparatus which resolves an ATM address without using a server.

The present invention is a transmission apparatus which resolves an ATM address. The transmission apparatus is provided between a terminating node and an ATM-switch network. The transmission apparatus includes a first apparatus which receives an ATM address of another transmission apparatus and a layer-3 address of a terminating node connected to the other transmission apparatus from the other transmission apparatus, and catalogs the ATM address and the layer-3 address into a table; and a record apparatus which searches the table using a layer-3 address of a destination terminating node which is a destination of transmission of data received from a source terminating node connected to the transmission apparatus to acquire an ATM address of the other transmission apparatus connected to the destination terminating node, and communicates with the other transmission apparatus by using the acquired ATM address to transmit a cell including information of the layer-3 address of the destination terminating node.

In addition, the present invention provides a network system including the above described transmission apparatus. Terminating nodes and transmission apparatuses constitute a network like an existing LAN wherein communication is carried out by using a layer-2 address. The transmission apparatuses form an ATM-switch network, wherein communication is carried out by using an ATM address. Terminating nodes compose a network like an IP network wherein communication is carried out by using a layer-3 address.

BRIEF DESCRIPTION OF THE DRAWINGS

The scope of the present invention will be apparent from the following detailed description, when taken in conjunction with the accompanying drawings, and such detailed description and specific examples, while indicating preferred embodiments of the invention, are given by way of illustration only, since various changes and modifications within the spirit and scope of the invention will become apparent to those skilled in the art from this detailed description, in which:

FIG. 1 is a block diagram illustrating a configuration of a network system implemented by an embodiment of the present invention;

FIG. 2 is a block diagram illustrating an internal configuration of a switching HUB 10 of the present invention;

FIG. 3 is a diagram illustrating a data structure of an address control table of the present invention;

FIG. 4 is a flowchart illustrating a flow of processing carried out by execution of a terminal-cataloging processing module of the present invention;

FIGS. 5A and B are diagrams illustrating examples of data items stored in the address control table 15 of the present invention;

FIG. 6 is a diagram illustrating a data format of a cell used for transmitting information on addresses of the present invention;

FIG. 7 is a flowchart illustrating a flow of processing carried out by execution of an address-exchange processing module of the present invention;

FIGS. 8A and B are diagrams illustrating an example of information on addresses added to the address control table of the present invention;

FIG. 9 is a diagram illustrating an example of information on addresses added to the address control table of the present invention;

FIG. 20 is a block diagram illustrating a switching HUB as implemented by another embodiment of the present invention;

FIG. 21 is a diagram illustrating a data structure of a transmitted cell which includes information on addresses of the present invention according to the other embodiment;

FIG. 22 is part I of a flowchart illustrating a flow of processing carried out by execution of a terminal-cataloging processing module provided by the other embodiment of the present invention;

FIG. 24 is part III of the flowchart illustrating a flow of processing carried out by execution of the terminal-cataloging processing module provided by the other embodiment of the present invention;

DETAILED DESCRIPTION OF THE INVENTION

Figures 10, 11:
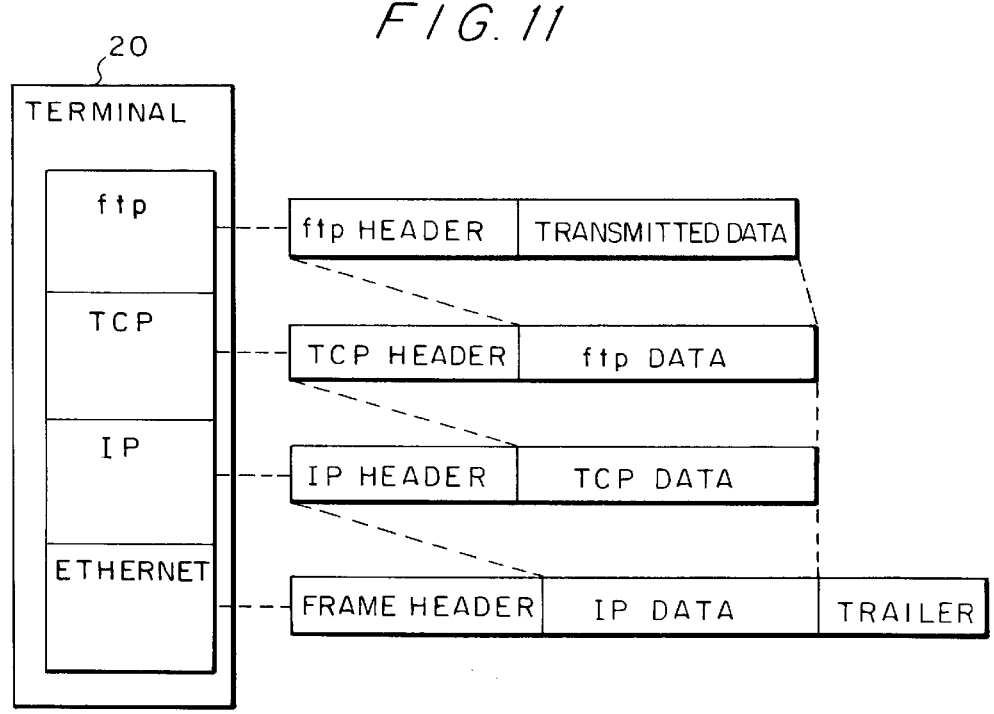
FIG. 10 is a diagram illustrating an example of information on addresses added to the address control table of another switching HUB of the present invention.
FIG. 11 is a diagram illustrating a network hierarchical layers of a terminating node and data structures of transmitted data created at the layers of the present invention.

FIG. 1 is a block diagram showing the configuration of a network system implemented by an embodiment of the present invention. As shown in FIG. 1, an ATM-switch network 24 includes ATM switches 26-1 and 26-2 each for transmitting cells. The ATM-switch network 24 is connected to switching HUBs 10-1 and 10-2. An existing LAN 22 is a network connecting a switching hub 10 to terminating nodes 20 so as to allow frames to be transmitted between the switching hub 10 and the terminating nodes 20. In general, the switching HUB 10 is a transmission apparatus provided between the ATM-switch network 24 and the terminating nodes 20. The switching HUB 10 has a cell transmitting/receiving port 14 for receiving and transmitting cells from and to the ATM-switch network 24 and a frame transmitting/receiving port 13 for receiving and transmitting frames from and to the terminating nodes 20. Symbols enclosed in parentheses in the switching HUB 10 represent 3 different kinds of addresses of the switching HUB 10, namely, an ATM address, a MAC address and a layer-3 address respectively. Similarly, symbols enclosed in parentheses in the terminating node 20 represent 3 different kinds of addresses of the terminating node 20. In this embodiment, the switching HUB 10 does not have a layer-3 address. However, a layer-3 address can be assigned to the switching HUB 10. In addition, the terminating node 20 does not have an ATM address.

In the following description, the switching HUB 10-1 or 10-2 is represented by generic notation switching HUB 10. This representation using a generic notation also applies to the frame transmitting/receiving ports 13-n, the cell transmitting/receiving ports 14-n and the terminating nodes 20-n.

FIG. 2 is a block diagram the internal configuration of the switching HUB 10. As illustrated in FIG. 2, the switching HUB 10 includes a CPU 11, a main storage unit (a memory unit) 12, a frame transmitting/receiving port 13, and a cell transmitting/receiving port 14. Stored in the memory unit 12 are an address control table 15, a terminal-cataloging processing module 16, an address-exchange processing module 17, a frame-reception processing module 18 and a cell-reception processing module 19. The address control table 15 is a table for cataloging information on addresses of terminating nodes 20 connected to this switching HUB 10 and to other switching HUBs 10. The terminal-cataloging processing module 16 polls terminating nodes 20 connected to this switching HUB 10 and catalogs information on addresses of terminating nodes 20 responding to the polling as an entry in the address control table 15.

The address-exchange processing module 17 catalogs information on addresses received from another switching HUB 10 as an entry in the address control table 15 and transmits information on addresses of terminating nodes 20 connected to this switching HUB 10 cataloged in the address control table 15 to other switching HUBs 10. The frame-reception processing module 18 receives a frame transmitted by a terminating node 20 from the frame transmitting/receiving port 13, then generates a cell having the ATM address of a switching HUB 10 connected to a terminating node 20, the destination of the received frame, by referring to the address control table 15 and finally transmits the cell to the switching HUB 10 of the destination terminating node 20 by way of the cell transmitting/receiving port 14. The cell-reception processing module 19 receives a cell transmitted by another switching HUB 10 from the cell transmitting/receiving port 14, then generates a frame having the MAC address of a terminating node 20, the destination of the received cell, by referring to the address control table 15 and finally transmits the frame to the destination terminating node 20 by way of the frame transmitting/receiving port 13.

While the frame transmitting/receiving module 18 and the cell transmitting/receiving module 19 can be implemented by hardware, in this embodiment, they are implemented by firmware executed by the CPU 11. The terminal-cataloging processing module 16 carries out meaningful processing only when information on addresses of a new terminating node 20 is cataloged as an entry in the address control table 15. Similarly, the address-exchange processing module 17 carries out meaningful processing only when cataloging information on addresses received from another switching HUB 10 as an entry in the address control table 15 and transmitting information on addresses of terminating nodes 20 connected to this switching HUB 10 cataloged in the address control table 15 to other switching HUBs 10. Thus, since loads borne by the CPU 11 for execution of the modules 16 and 17 are small, they can be implemented by software or programs.

FIG. 3 is a diagram illustrating the data structure of the address control table 15. As shown in FIG. 3, each entry of the address control table 15 comprises data items including an ATM address 31, a MAC address 32, a layer-3 address 33 and a connection port 34 for a terminating node 20. The ATM address 31 does not apply to a terminating node 20 connected to this switching HUB 10 but is cataloged only for a terminating node 20 connected to another switching HUB 10. The data item 31 for a terminating node 20 is the ATM address of another switching HUB 10 to which the terminating node 20 is connected. The data item 32 for a terminating node 20 is a MAC address, that is, the layer-2 address of the terminating node 20. The data item 33 for a terminating node 20 is the layer-3 address of the terminating node 20 such as an IP address.

In the case of a terminating node 20 connected to this switching HUB 10, the data item 34 is the port number of a frame transmitting/receiving port 13 of this switching HUB 10 to which the terminating node 20 is connected. In the case of a terminating node 20 connected to another switching HUB 10, on the other hand, the data item 34 is the port number of the cell transmitting/receiving port 14 of the other switching HUB 10. It should be noted that, in an initial state such as a state established right after the power supply of the switching HUB 10 is turned on, the address control table 15 is empty.

FIG. 4 is a flowchart illustrating the flow of processing carried out by execution of the terminal-cataloging processing module 16. It should be noted that each of the steps of the flowchart could, for example, corresponds to one or more instructions of a computer program executable by the CPU 11 to implement the terminal-cataloging module 16. The computer program can, for example, be provided for installation in the storage unit 12 by a storage medium such as a floppy disk, CD ROM, etc. The computer program can also be provided by a network. The execution of the terminal-cataloging processing module 16 is started when the power supply of the switching HUB 10 is turned on. The processing is carried out repeatedly until the power supply is turned off. As shown in FIG. 4, the processing of the terminal-cataloging processing module 16 begins with a step 42 at which a terminal-cataloging timer is started. The flow of the processing then goes on to a step 43 to poll each terminating node 20 connected to any frame transmitting/ receiving port 13 with the MAC address thereof not cataloged yet in the address control table 15 through the frame transmitting/receiving port 13. Then, the flow of the processing proceeds to a step 44 to form a judgment as to whether or not a response was received from a polled terminating node 20. If a response was received from a polled terminating node 20, that is, if the outcome of the judgment formed at the step 44 is YES, the flow of the processing continues to a step 45 to catalog the MAC address and the layer-3 address of the responding terminating node 20 as well as the number of the frame transmitting/receiving port 13 to which the responding terminating node 20 is connected as an entry in the address control table 15 in the fields of the data item 32, the data item 33 and the connection port 34 of the entry respectively.

The flow of the processing then goes on to a step 46 to form a judgment as to whether or not the terminal-cataloging timer has signaled a time-out. If the terminal-cataloging timer has not signaled a time-out yet, that is, if the outcome of the judgment formed at the step 46 is NO, the formation of the judgment at the step 46 is repeated until its outcome indicates that the terminal-cataloging timer has signaled a time-out. As the terminal-cataloging timer signals a time-out, that is, as the outcome of the judgment formed at the step 46 turns to YES, the flow of the processing proceeds to a step 47 at which the terminal-cataloging timer is reset.

The flow of the processing then goes back to the step 42. If the outcome of the judgment formed at the step 44 indicates that no responses were received from the polled terminating nodes 20, that is, if the outcome of the judgment is NO, on the other hand, the flow of the processing continues to the step 46. It should be noted that the method adopted by a switching HUB 10 for acquiring information on addresses of a terminating node 20 connected to the switching HUB 10 is not limited to the polling technique described above. In general, a switching HUB 10 can acquire information on addresses of a terminating node 20 connected to the switching HUB 10 by sending the terminating node 20 an inquiry about the information. As an alternative, a terminating node 20 spontaneously transmits information on the address thereof to a switching HUB 10 to which the terminating node 20 is connected.

FIG. 5A is a diagram illustrating examples of data items stored in the address control table 15 of the switching HUB 10-1. To be more specific, the address control table 15 contains cataloged pieces of information on addresses transmitted by the terminating nodes 20-1 and 20-2 in response to polling conducted by the switching HUB 10-1. FIG. 5B is a diagram illustrating examples of data items stored in the address control table 15 of the switching HUB 10-2. To be more specific, the address control table 15 contains information on addresses transmitted by the terminating node 20-3 in response to polling conducted by the switching HUB 10-2.

FIG. 6 is a diagram illustrating the data format of a cell accommodating information on addresses transmitted between the switching HUBs 10-1 and 10-2 by way of the ATM-switch network 24. As shown in FIG. 6, a 48-byte cell-data field is used for storing 3 kinds of address, namely, the ATM address of the transmitting switching HUB 10, the MAC address of a terminating node 20 connected to the transmitting switching HUB 10 and the layer-3 address of the terminating node 20.

FIG. 7 is a flowchart illustrating the flow of processing carried out by execution of the address-exchange processing module 17. It should be noted that each of the steps of the flowchart could, for example, corresponds to one or more instructions of a computer program executable by the CPU 11 to implement the address-exchange processing module 17. The computer program can, for example, be provided for installation in the storage unit 12 by a storage medium such as a floppy disk, CD ROM, etc. The computer program can also be provided by a network. The address-exchange processing module 17 is executed when new information on addresses is cataloged as an entry in the address control table 15 or information on addresses is received from another switching HUB 10. As shown in the figure, the processing begins with a step 52 to form a judgment as to whether or not information on addresses has been received from another switching HUB 10 by way of the cell transmitting/receiving port 14. If information on addresses has been received from another switching HUB 10, that is, if the outcome of the judgment formed at the step 52 is YES, the flow of the processing goes on to a step 53 at which the information on addresses is cataloged as an entry in the address control table 15.

As the data item 34 of the entry, the port number of the cell transmitting/receiving port 14, through which the information on addresses was received, is set. It should be noted that, if the information on addresses has already been cataloged as an entry in the address control table 15, the information is just discarded. After completing the step 53 or if the outcome of the judgment formed at the step 52 is NO, the flow of the processing proceeds to a step 54 to form a judgment as to whether or not information on addresses was newly cataloged as an entry in the address control table 15 for a terminating node 20. If information on addresses was newly cataloged as an entry in the address control table 15, that is, if the outcome of the judgment formed at the step 54 is YES, the flow of the processing continues to a step 55 to poll all other switching HUBs 10 connected to the ATM-switch network 24 through the cell transmitting/receiving port 14. Then, the flow of the processing goes on to a step 56 to form a judgment as to whether or not there was a response from any of the polled switching HUBs 10.

If there was a response from any of the polled switching HUBs 10, that is, if the outcome of the judgment formed at the step 56 is YES, the flow of the processing proceeds to a step 57 at which its own ATM address and the MAC address 32 as well as the layer-3 address 33 of an entry newly cataloged in the address control table 15 are transmitted to a switching HUB 10 returning the response. If there was no response from any of the polled switching HUBs 10, that is, if the outcome of the judgment formed at the step 56 is NO, on the other hand, the processing is ended. Also, if no information on addresses was newly cataloged as an entry in the address control table 15, that is, if the outcome of the judgment formed at the step 54 is NO, the processing is ended as well. It should be noted that, when this switching HUB 10 is polled by another switching HUB 10, a response is transmitted to the other switching HUB 10. As described above, information on addresses newly cataloged as an entry in the address control table 15 is disseminated to other switching HUBs 10 by adopting a polling technique. It is worth noting, however, that the method to disseminate information on addresses newly cataloged as an entry in the address control table 15 to other switching HUBs 10 is not limited to such a polling means. In general, a switching HUB 10 can acquire information on addresses from another switching HUB 10 by sending the other switching HUB 10 an inquiry about such information. As an alternative, a switching HUB 10 can disseminate information on addresses to other switching HUBs 10 by adopting a broadcasting technique.

When information on addresses of the terminating node 20-3 is cataloged as an entry in the address control table 15 of the switching HUB 10-2, the information is disseminated to the switching HUB 10-1 to be added to the address control table 15 of the switching HUB 10-1 as illustrated in FIG. 8A. On the other hand, when pieces of information on addresses of the terminating nodes 20-1 and 20-2 are cataloged each as an entry in the address control table 15 of the switching HUB 10-1, the pieces of information are disseminated to the switching HUB 10-2 to be added to the address control table 15 of the switching HUB 10-2 as illustrated in FIG. 8B. It should be noted that, while the MAC address 32 of a terminating node 20 connected to another switching HUB 10 is not referenced, in this embodiment, the MAC address 32 is cataloged as an entry in the address control table 15 only in order to conform to the format of the address control table 15. Of course, it is not necessary to acquire the MAC address 32 of a terminating node 20 connected to another switching HUB 10 and to catalog the MAC address 32 as an entry in the address control table 15.

FIG. 9 is a diagram illustrating contents of the address control table 15 of the switching HUB 10-2 which are obtained as a result of newly cataloging an additional entry for information on addresses of a terminating node 20-4 connected to the switching HUB 10-2 to the existing entries shown in FIG. 8B.

After the information on addresses of the terminating node 20-4 has been cataloged as an entry in the address control table 15 of the switching HUB 10-2, the information is disseminated to the switching HUB 10-1 to be added to the address control table 15 of the switching HUB 10-1 as illustrated in FIG. 10.

FIG. 11 is a diagram illustrating network hierarchical layers of a terminating node 20 and data structures of transmitted data created at the layers. Starting from the top, the hierarchical layers are an application layer, a transport layer, a network layer and a data-link layer. As illustrated in FIG. 11, the protocols of the application layer and the transport layer are an file transfer protocol (ftp) and a TCP respectively while the protocols of the network layer and the data-link layer are an Internet protocol (IP) and an Ethernet protocol respectively. In the ftp, an ftp header is added to transmitted data to form ftp data and, in the TCP, a TCP header is added to the ftp data to form TCP data. Subsequently, in the IP, an IP header is added to the TCP data to form IP data (or an IP packet) and, in the Ethernet protocol, a frame header and a trailer are added to the IP data to form a frame.

Figure 12:
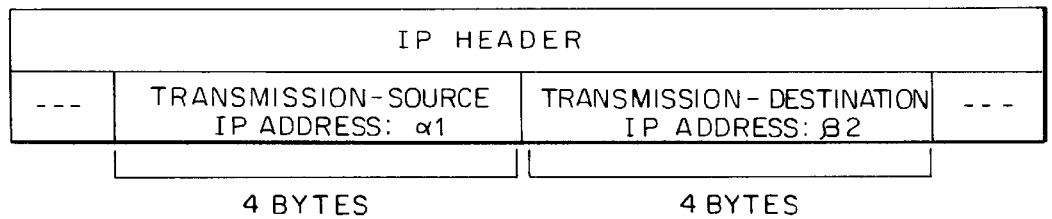
FIG. 12 is a diagram illustrating an IP header including an example of information on addresses of the present invention.

FIG. 12 is a diagram illustrating an IP header wherein the IP address of a transmission origin, that is, a1 in the example, and the IP address of a transmission destination, that is, a2 in the example, are set.

Figure 13:
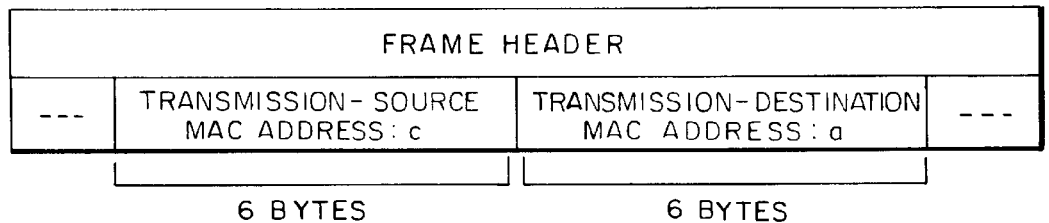
FIG. 13 is a diagram illustrating a frame header including an example of information on addresses of the present invention.

FIG. 13 is a diagram illustrating a frame header wherein the MAC address of a transmission origin, that is, c in the example, and the MAC address of a transmission destination, that is, a in the example, are set.

Figure 14:
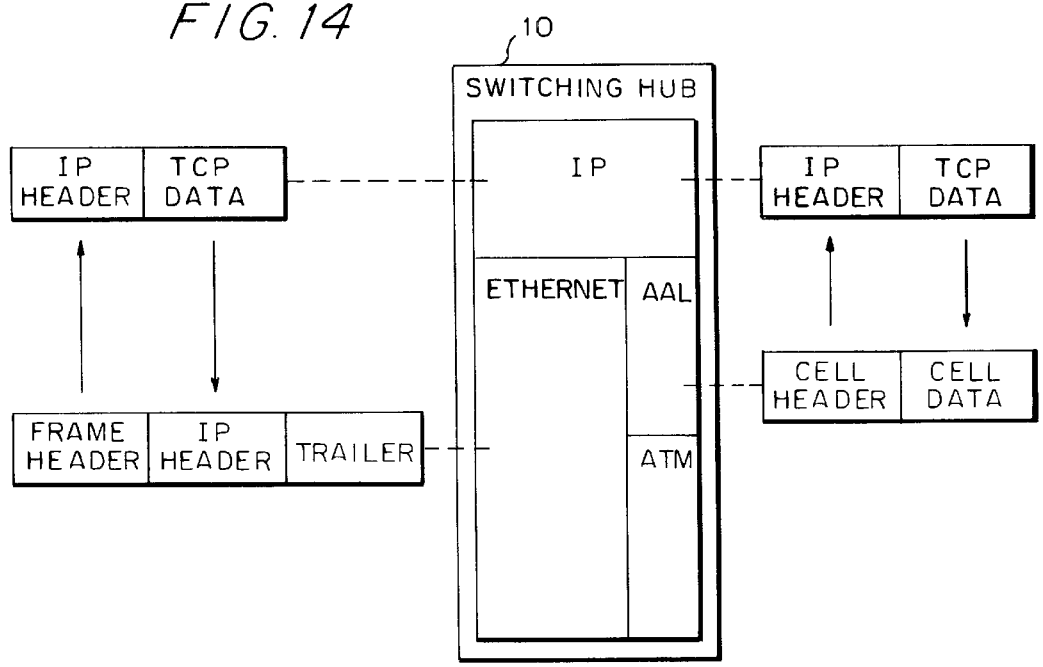
FIG. 14 is a diagram illustrating a network hierarchical layers of a switching HUB and data structures of data created or transmitted at the layers of the present invention.

FIG. 14 is a diagram illustrating network hierarchical layers of a switching HUB 10 and data structures of data created or transmitted at the layers. In the Ethernet protocol of the data-link layer, a frame is transmitted or received and, in the IP of the network layer, IP data (or an IP packet) is generated. At the AAL (ATM Adaptation Layer) of the data-link layer, a cell is created and at the ATM layer of the data-link layer, a cell is transmitted or received.

Figure 15:
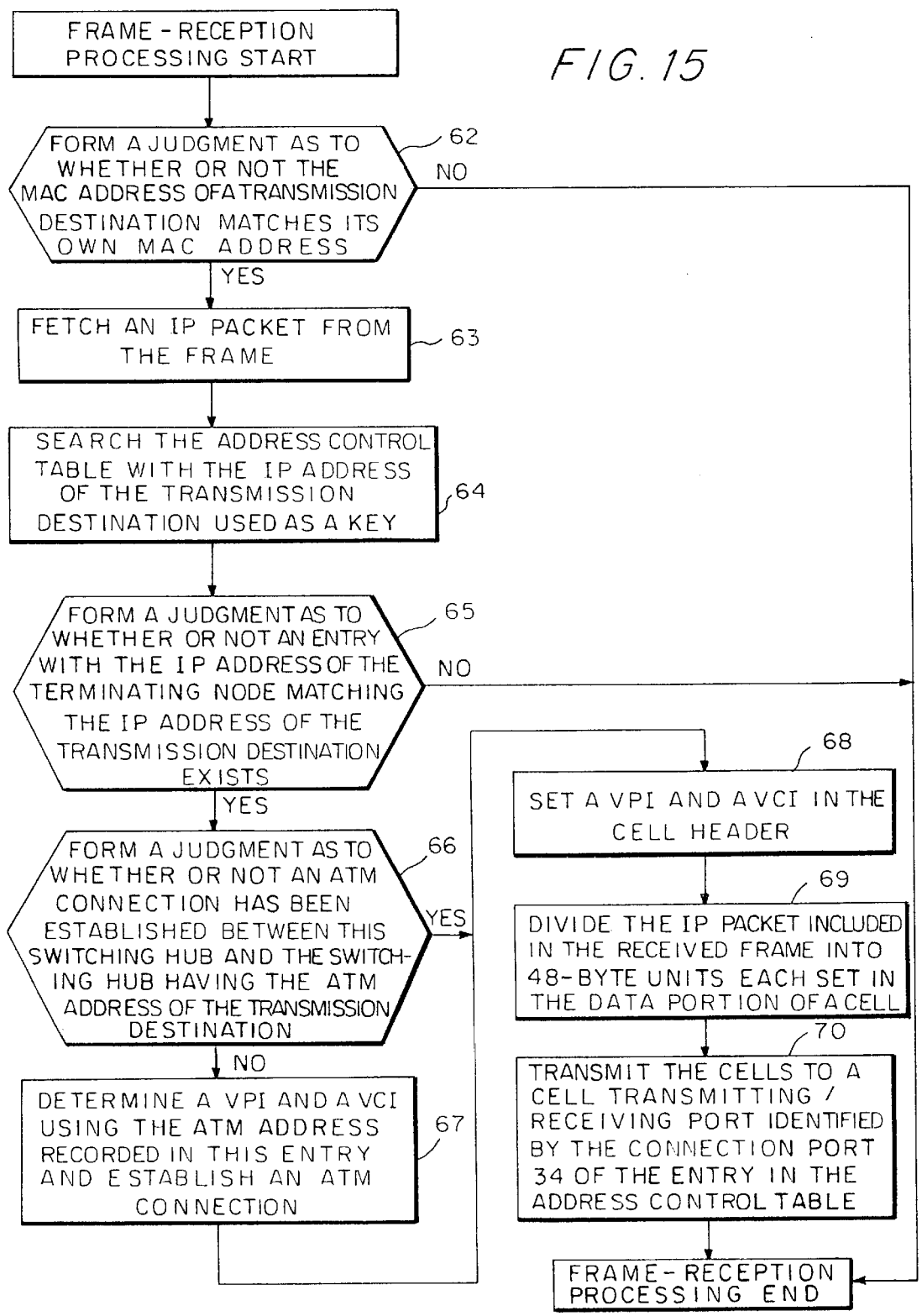
FIG. 15 is a flowchart illustrating a procedure of processing carried out by execution of a frame-reception processing module of the present invention.

FIG. 15 is a flowchart illustrating the procedure of processing carried out by execution of the frame-reception processing module 18. It should be noted that each of the steps of the flowchart could, for example, correspond to one or more installations of a computer program executable by the CPU 11 to implement the frame-reception processing module 18. The computer program can, for example, be provided for installation in the storage unit 12 by a storage medium such as a floppy disk, CD ROM, etc. The computer program can also be provided by a network. As shown in FIG. 15, the procedure begins with a step 62 to form a judgment as to whether or not the MAC address of a transmission destination included in the frame header of a frame received by the frame-reception processing module 18 from a terminating node 20 through the frame transmitting/receiving port 13 matches its own MAC address. If both the MAC addresses match each other, that is, if the outcome of the judgment formed at the step 62 is YES, the flow of the procedure goes on to a step 63 at which an IP packet is fetched from the frame. The flow of the procedure then proceeds to a step 64 at which the address control table 15 is searched with the IP address of the transmission destination in the IP header used as a key. Then, the flow of the procedure continues to a step 65 to form a judgment as to whether or not an entry with the IP address of the terminating node 20 matching the IP address of the transmission destination exists in the address control table 15. If such an entry exists, that is, if the outcome of the judgment formed at the step 65 is YES, a switching HUB 10 having the ATM address of the transmission destination can be identified.

In this case, the flow of the procedure goes on to a step 66 to form a judgment as to whether or not an ATM connection has been established between this switching HUB 10 and the switching HUB 10 having the ATM address of the transmission destination. If an ATM connection has not been established between this switching HUB 10 and the switching HUB 10 having the ATM address of the transmission destination, that is, if the outcome of the judgment formed at the step 66 is NO, the flow of the procedure proceeds to a step 67 at which a Virtual Path Identifier (VPI) and a Virtual Channel Identifier (VCI) are determined by negotiation with the partner switching HUB 10 using the ATM address recorded in this entry and an ATM connection is established.

The flow of the procedure then continues to a step 68. If an ATM connection has already been established between this switching HUB 10 and the switching HUB 10 having the ATM address of the transmission destination, that is, if the outcome of the judgment formed at the step 66 is YES, on the other hand, the flow of the procedure proceeds directly to the step 68 at which a VPI and a VCI are set in the cell header. The flow of the procedure then goes on to a step 69 at which the IP packet included in the received frame is divided into 48-byte units each set in the data portion of a cell. By the way, the pieces of processing carried out at the steps 68 and 69 are each AAL processing. Then, the flow of the procedure proceeds to a step 70 at which the cells are transmitted to a cell transmitting/receiving port 14 identified by the connection port 34 of the entry in the address control table 15.

If the MAC address of the transmission destination included in the frame header of the frame received by the frame-reception processing module 18 from a terminating node 20 through the frame transmitting/receiving port 13 does not match its own MAC address, that is, if the outcome of the judgment formed at the step 62 is NO, or if an entry with the IP address of the terminating node 20 matching the IP address of the transmission destination does not exist in the address control table 15, that is, if the outcome of the judgment formed at the step 65 is NO, on the other hand, the processing of the frame transmitting/receiving processing module 18 is simply ended.

Figure 16:
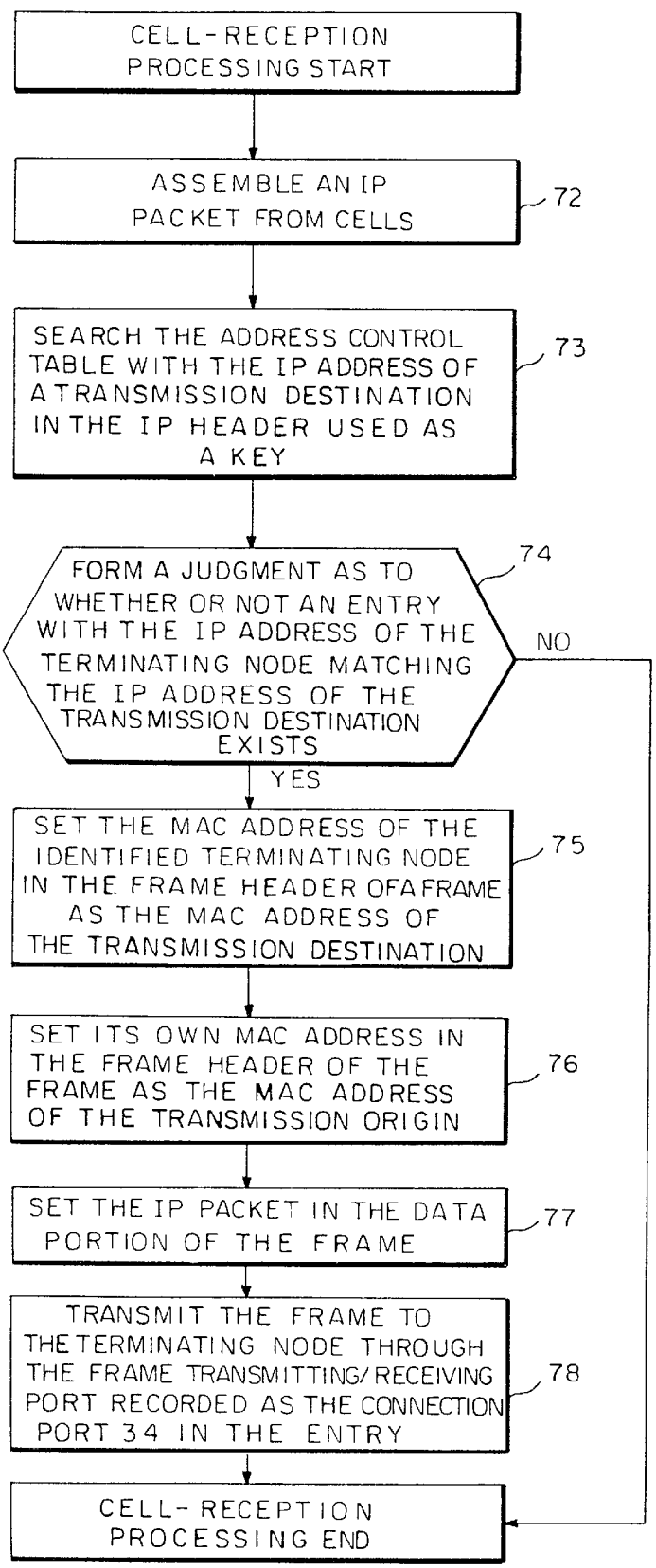
FIG. 16 is a flowchart illustrating procedure of processing carried out by execution of a cell-reception processing module of the present invention.

FIG. 16 is a flowchart illustrating the procedure of processing carried out by execution of the cell-reception processing module 19. It should be noted that each of the steps of the flowchart could, for example, correspond to one or more instructions of a computer program executable by the CPU 11 to implement the cell-reception processing module 19. The computer program can, for example, be provided for installation in the storage unit 12 by a storage medium such as a floppy disk, CD ROM, etc. The computer program can also be provided by a network. As shown in FIG. 16, the procedure begins with a step 72 at which an IP packet is assembled from at least 1 cell received by the cell-reception processing module 19 from a partner switching HUB 10 through the cell transmitting/receiving port 14. The flow of the procedure then goes on to a step 73 at which the address control table 15 is searched with the IP address of a transmission destination in the IP header used as a key.

Then, the flow of the procedure continues to a step 74 to form a judgment as to whether or not an entry with the IP address of the terminating node 20 matching the IP address of the transmission destination exists in the address control table 15.

If such an entry exists, that is, if the outcome of the judgment formed at the step 74 is YES, a terminating node 20 having the ATM address of the transmission destination can be identified. In this case, the flow of the procedure goes on to a step 75 at which the MAC address of the identified terminating node 20 is set in the frame header of a frame as the MAC address of the transmission destination. Then, the flow of the procedure proceeds to a step 76 at which its own MAC address is set in the frame header of the frame as the MAC address of the transmission origin.

Figure 17:
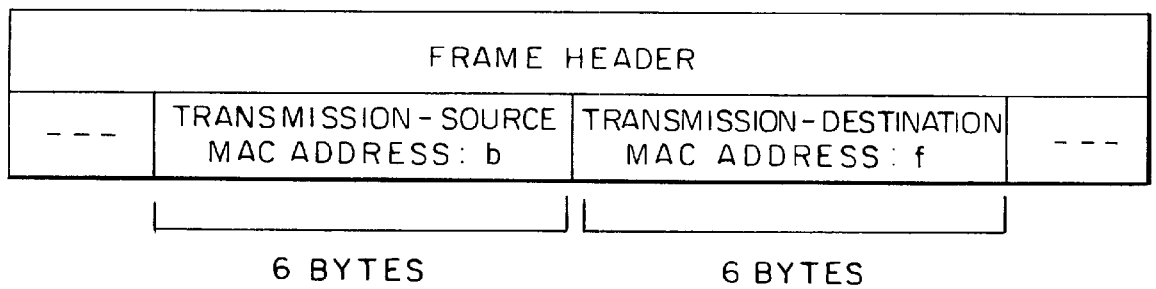
FIG. 17 is a diagram illustrating a frame header including an example of information on addresses of the present invention.
Figure 18:
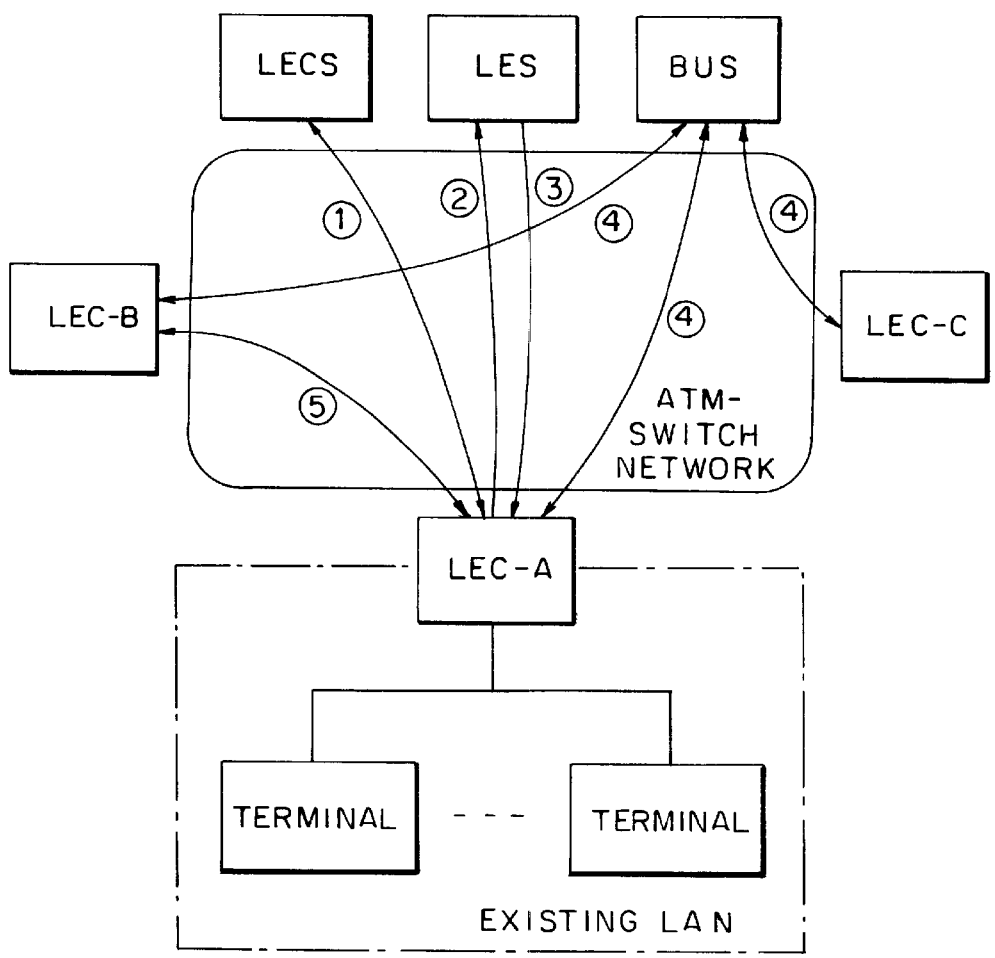
FIG. 18 is an explanatory diagram used for describing a technique adopted by the LAN-emulation system for resolving an address.
Figure 19:
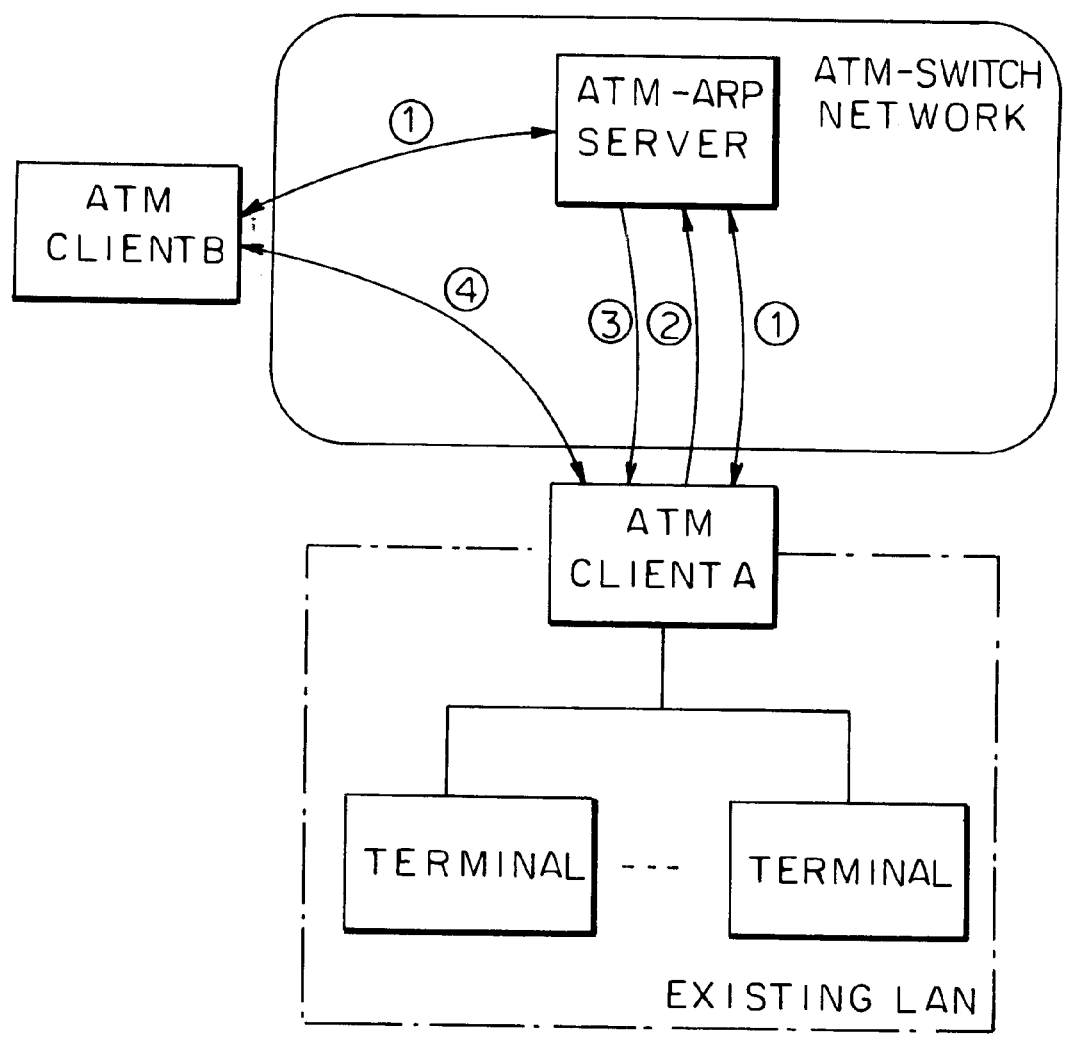
FIG. 19 is an explanatory diagram used for describing a technique adopted by the I-over-ATM system to resolve an address.
Figure 23:
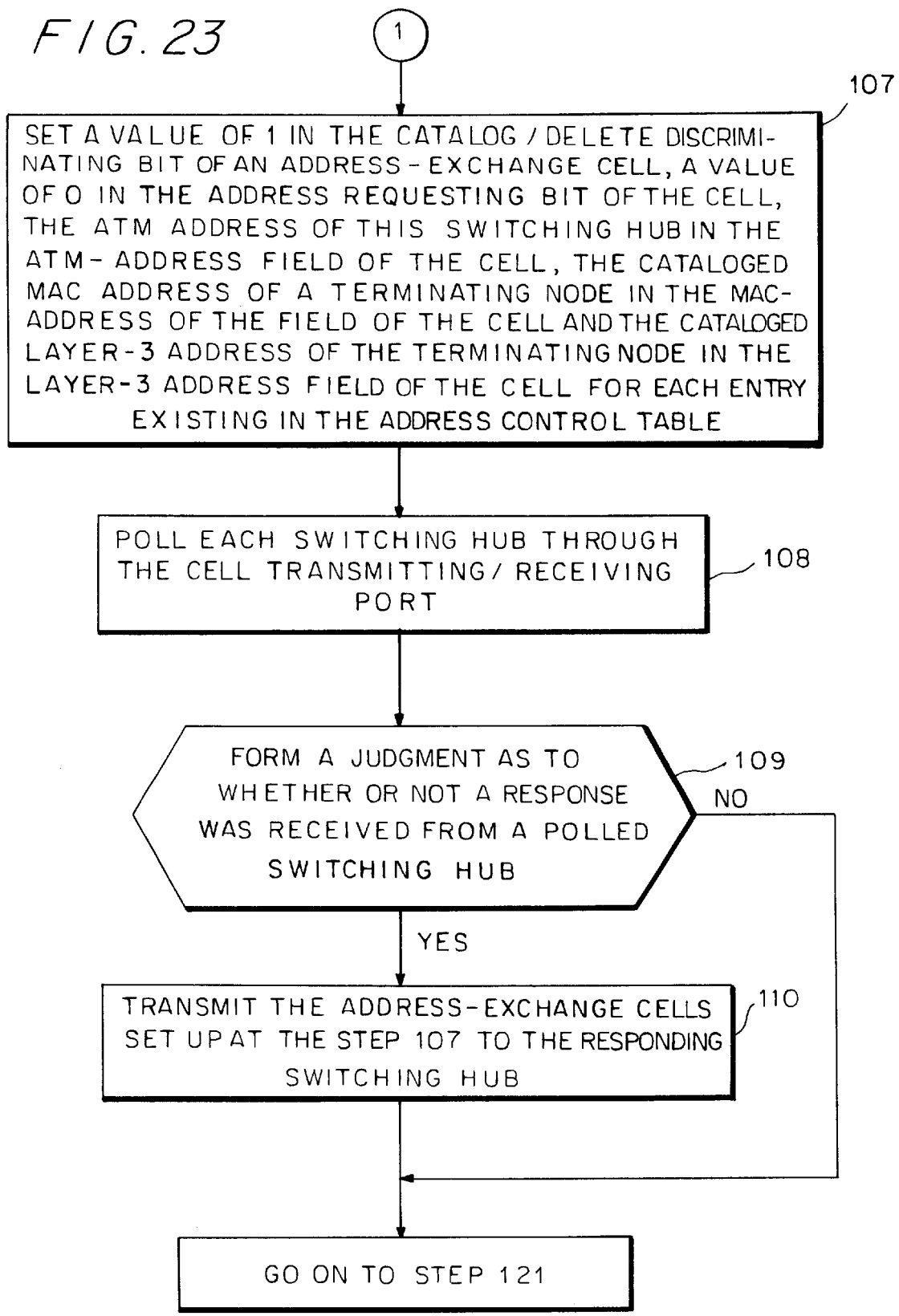
FIG. 23 is part II of the flowchart illustrating a flow of processing carried out by execution of the terminal-cataloging processing module provided by the other embodiment of the present invention.
Figure 25:
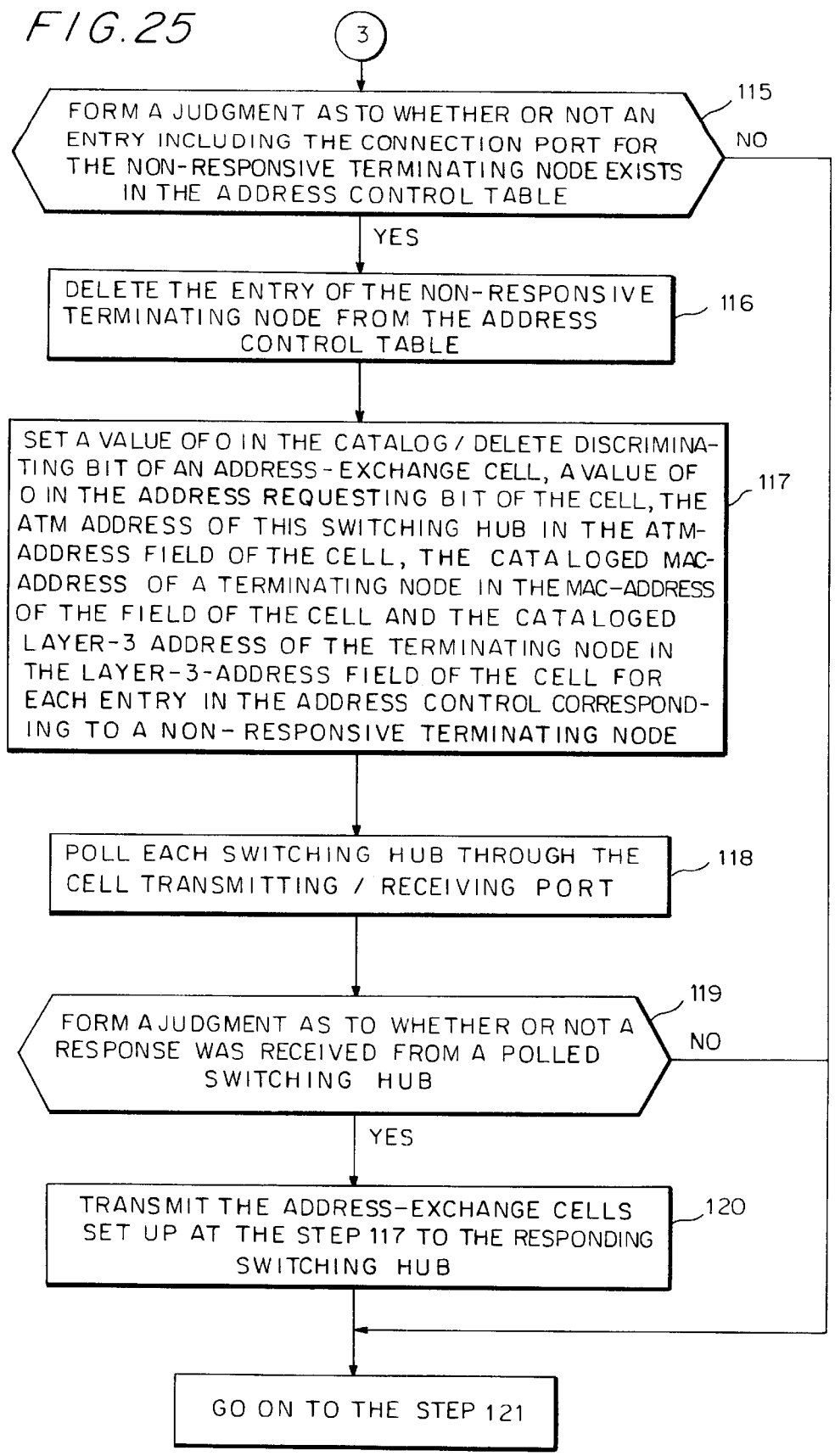
FIG. 25 is part IV of the flowchart illustrating a flow of processing carried out by execution of the terminal-cataloging processing module provided by the other embodiment of the present invention.

FIG. 17 is a diagram illustrating a typical frame header obtained as a result of the step 75 to set the MAC address of a transmission destination and the step 76 to set the MAC address of a transmission origin. Subsequently, the flow of the procedure continues to a step 77 at which the IP packet is set in the data portion of the frame. The flow of the procedure then goes on to a step 78 at which the frame is transmitted to the terminating node 20 identified by the MAC address 32 of the entry of the address control table 15 through the frame transmitting/receiving port 13 identified by the connection port 34 in the entry. If an entry with the IP address of the terminating node 20 matching the IP address of the transmission destination does not exist in the address control table 15, that is, if the outcome of the judgment formed at the step 74 is NO, on the other hand, the processing of the cell-reception processing module 19 is simply ended.

The terminating node 20 receiving the frame from the switching HUB 10 recognizes the frame as its own frame since the MAC address of the transmission destination recorded in the frame header matches its own MAC address. The received frame is delivered to layers at next upper levels sequentially one layer after another. Finally, the ftp application layer receives the frame. This procedure also applies to an application layer having a protocol other than the ftp such as telnet or SMTP.

According to the present embodiment, since the terminal-cataloging processing module 16 carries out useful processing only for cataloging a terminating node not cataloged yet as an entry in the address control table 15, the load borne by the CPU 11 in the execution of the terminal-cataloging processing module 16 is small. While the processing carried out by execution of the address-exchange processing module 17 entails communication through the ATM-switch network 24, the processing is carried out only when information on addresses of a new terminating node 20 is cataloged in the address control table 15 in an initial state or when information on addresses is received from another switching HUB 10. Thus, since the frequency at which the address-exchange processing is low, the load imposed by the address-exchange processing module 17 on the CPU 11 is low. As for the frame-reception processing module 18 and the cell-reception processing module 19, the processing involves an Internet layer which is used as a network layer. However, since an address can be resolved by merely referring to information recorded in an address control table 15, the processing to resolve an address does not entail communication through the ATM-switch network 24. As a result, the frame-reception processing module 18 and the cell-reception processing module 19 can be implemented by hardware to reduce the overhead of the CPU 11.

FIG. 20 is a block diagram illustrating a switching HUB 10' as implemented by another embodiment of the present invention. The switching HUB 10' is different from the switching HUB 10 described so far in that a terminal-cataloging processing module 16' and an address-exchange processing module 17' employed in the former are different from their counterparts employed in the latter.

FIG. 21 is a diagram illustrating the data structure of a cell which includes information on addresses transmitted between a switching HUB 10'-1 and another switching HUB 10'-2 by way of the ATM-switch network 24. This cell is referred to hereafter as an address-exchange cell. As shown in FIG. 21, a 48-byte data portion of the cell comprises a catalog/delete discriminating bit, an address requesting bit, an ATM-address field, a MAC-address field and a layer-3-address field. The catalog/delete discriminating bit is an identification bit indicating whether the transmitted address-exchange cell is used for requesting that the information on addresses be cataloged or deleted. To be more specific, a value of 1 set in this bit indicates that the transmitted address-exchange cell is used for requesting that the information on addresses be cataloged. On the other hand, a value of 0 set in this bit indicates that the transmitted address-exchange cell is used for requesting that the information on addresses be deleted. Similarly, the address requesting bit is an identification bit indicating or not whether the transmitted address-exchange cell is used for requesting information on addresses cataloged as an entry in the address control table 15 of a switching HUB 10' to which the address-exchange cell is transmitted. To be more specific, a value of 1 set in this bit indicates that the transmitted address-exchange cell is used for requesting transmission of the information on addresses. On the other hand, a value of 0 set in this bit indicates that the transmitted address-exchange cell is not used for requesting transmission of the information on addresses.

FIGS. 22, 23, 24 and 25 are a flowchart illustrating the flow of processing carried out by execution of the terminal-cataloging processing module 16'. It should be noted that each of the steps of the flowchart could, for example, correspond to one or more instructions of a computer program executable by the CPU 11 to implement the terminal-cataloging processing module 16'. The computer program can, for example, be provided for installation in the storage unit 12 by a storage medium such as a floppy disk, CD ROM, etc. The computer program can also be provided by a network. The execution of the terminal-cataloging processing module 16' is started when the power supply of the switching HUB 10' is turned on. The processing is carried out repeatedly until the power supply is turned off. As shown in FIG. 22, the processing of the terminal-cataloging processing module 16' begins with a step 101 at which a terminal-cataloging timer is started. The flow of the processing then goes on to a step 102 to poll each terminating node 20 connected to any frame transmitting/receiving port 13. Then, the flow of the processing proceeds to a step 103 to form a judgment as to whether or not a response was received from a polled terminating node 20. If a response was received from a polled terminating node 20, that is, if the outcome of the judgment formed at the step 103 is YES, the flow of the processing continues to a step 104 to form a judgment as to whether or not the MAC address of the responding terminating node 20 has been cataloged as an entry in the address control table 15.

If the MAC address of the responding terminating node 20 has not been cataloged yet as an entry in the address control table 15, that is, if the outcome of the judgment formed at the step 104 is NO, the flow of the processing continues to a step 105 to catalog the MAC address and the layer-3 address of the responding terminating node 20 as well as the number of the frame transmitting/receiving port 13 to which the responding terminating node 20 is connected as an entry of the address control table 15 in the fields of the data item 32 and the data item 33 as well as the connection port 34 of the entry respectively.

The flow of the processing then proceeds to a step 106 to form a judgment as to whether or not an entry for another terminating node 20 exists in the address control table 15. If an entry for another terminating node 20 exists in the address control table 15, that is, if the outcome of the judgment formed at the step 106 is YES, the flow of the processing continues to a step 107 shown in FIG. 23 to set a value of 1 in the catalog/delete discriminating bit of an address-exchange cell, a value of 0 in the address requesting bit of the cell, the ATM address of this switching HUB 10' in the ATM-address field of the cell, the cataloged MAC address of the of a terminating node 20 in the MAC-address of the field of the cell and the cataloged layer-3 address of the terminating node 20 in the layer-3-address field of the cell for each entry existing in the address control table 15.

The flow of the processing then goes on to a step 108 to poll each switching HUB 10' through the cell transmitting/receiving port 14 and the ATM-switch network 24. Then, the flow of the processing proceeds to a step 109 to form a judgment as to whether or not a response was received from a polled switching HUB 10'. If a response was received from a polled switching HUB 10', that is, if the outcome of the judgment formed at the step 109 is YES, the flow of the processing continues to a step 110 to transmit the address-exchange cells set up at the step 107 to the responding switching HUB 10'. The flow of the processing then goes on to a step 121 shown in FIG. 22. If no response was received from a polled switching HUB 10', that is, if the outcome of the judgment formed at the step 109 is NO, on the other hand, the flow of the processing continues directly to the step 121.

If an entry for another terminating node 20 does not exist in the address control table 15, that is, if the outcome of the judgment formed at the step 106 is NO, on the other hand, the address control table 15 is considered to be in an empty state, a state which is seen for example when the power supply of the switching HUB 10' is turned on. In this case, the flow of the processing continues to a step 111 shown in FIG. 24 to set a value of 1 in the catalog/delete discriminating bit of the address-exchange cell, a value of 1 in the address requesting bit of the cell, the ATM address of this switching HUB 10' in the ATM-address field of the cell, the cataloged MAC address of the of a terminating node 20 in the MAC-address of the field of the cell and the cataloged layer-3 address of the terminating node 20 in the layer-3-address field of the cell.

The flow of the processing then goes on to a step 112 to poll each switching HUB 10' through the cell transmitting/receiving port 14 and the ATM-switch network 24. Then, the flow of the processing proceeds to a step 113 to form a judgment as to whether or not a response was received from a polled switching HUB 10'. If a response was received from a polled switching HUB 10', that is, if the outcome of the judgment formed at the step 113 is YES, the flow of the processing continues to a step 114 to transmit the address-exchange cell set up at the step 111 to the responding switching HUB 10'. The flow of the processing then goes on to the step 121. If no response was received from a polled switching HUB 10', that is, if the outcome of the judgment formed at the step 113 is NO, on the other hand, the flow of the processing continues directly to the step 121.

If no response was received from a polled terminating node 20 through the frame transmitting/receiving port 13, that is, if the outcome of the judgment formed at the step 103 is NO, on the other hand, the polled terminating node 20 is considered to have been disconnected from this switching HUB 10'. In this case, the flow of the processing continues to a step 115 shown in FIG. 25 to form a judgment as to whether or not an entry including the connection port 34 for the non-responsive terminating node 20 exists in the address control table 15. If an entry including the connection port 34 for the non-responsive terminating node 20 exists in the address control table 15, that is, if the outcome of the judgment formed at the step 115 is YES, the flow of the processing proceeds to a step 116 at which the entry is deleted from the address control table 15. Then, the flow of the processing goes on to a step 117 to set a value of 0 in the catalog/delete discriminating bit of an address-exchange cell, a value of 0 in the address requesting bit of the cell, the ATM address of this switching HUB 10' in the ATM-address field of the cell, the cataloged MAC address of the of a terminating node 20 in the MAC-address of the field of the cell and the cataloged layer-3 address of the terminating node 20 in the layer-3-address field of the cell for each entry corresponding to a non-responsive terminating node.

The flow of the processing then goes on to a step 118 to poll each switching HUB 10' through the cell transmitting/receiving port 14 and the ATM-switch network 24. Then, the flow of the processing proceeds to a step 119 to form a judgment as to whether or not a response was received from a polled switching HUB 10'. If a response was received from a polled switching HUB 10', that is, if the outcome of the judgment formed at the step 119 is YES, the flow of the processing continues to a step 120 to transmit the address-exchange cells set up at the step 117 to the responding switching HUB 10'. The flow of the processing then goes on to the step 121. If no response was received from a polled switching HUB 10', that is, if the outcome of the judgment formed at the step 119 is NO, on the other hand, the flow of the processing continues directly to the step 121.

If an entry including the connection port 34 for the non-responsive terminating node 20 does not exist in the address control table 15 that is, if the outcome of the judgment formed at the step 115 is NO, on the other hand, the flow of the processing jumps to the step 121. It should be noted that, as an alternative, an entry for a polled terminating node 20 judged to be a non-responsive terminating node 20 only once is not deleted from the address control table 15. Instead, the terminating node 20 is polled again. If the outcome of the judgment still indicates that there is no response from the terminating node 20 even after the terminating node 20 has been polled a predetermined number of times, the entry of the terminating node 20 is then deleted from the address control table 15.

If the MAC address of the terminating node 20 responding to the polling through the frame transmitting/receiving port 13 has been cataloged as an entry in the address control table 15, that is, if the outcome of the judgment formed at the step 104 shown in FIG. 22 is YES, on the other hand, the flow of the processing continues to the step 121 to form a judgment as to whether or not the terminal-cataloging timer has signaled a time-out. If the terminal-cataloging timer has not signaled a time-out yet, that is, if the outcome of the judgment formed at the step 121 NO, the same judgment is formed repeatedly at the step 121 until the terminal-cataloging timer signals a time-out. As the terminal-cataloging timer signals a time-out, that is, as the outcome of the judgment formed at the step 121 turns to YES, the flow of the processing goes on to a step 122 at which the terminal-cataloging timer is reset. Then, the flow of the processing goes back to the step 101.

Figure 26:
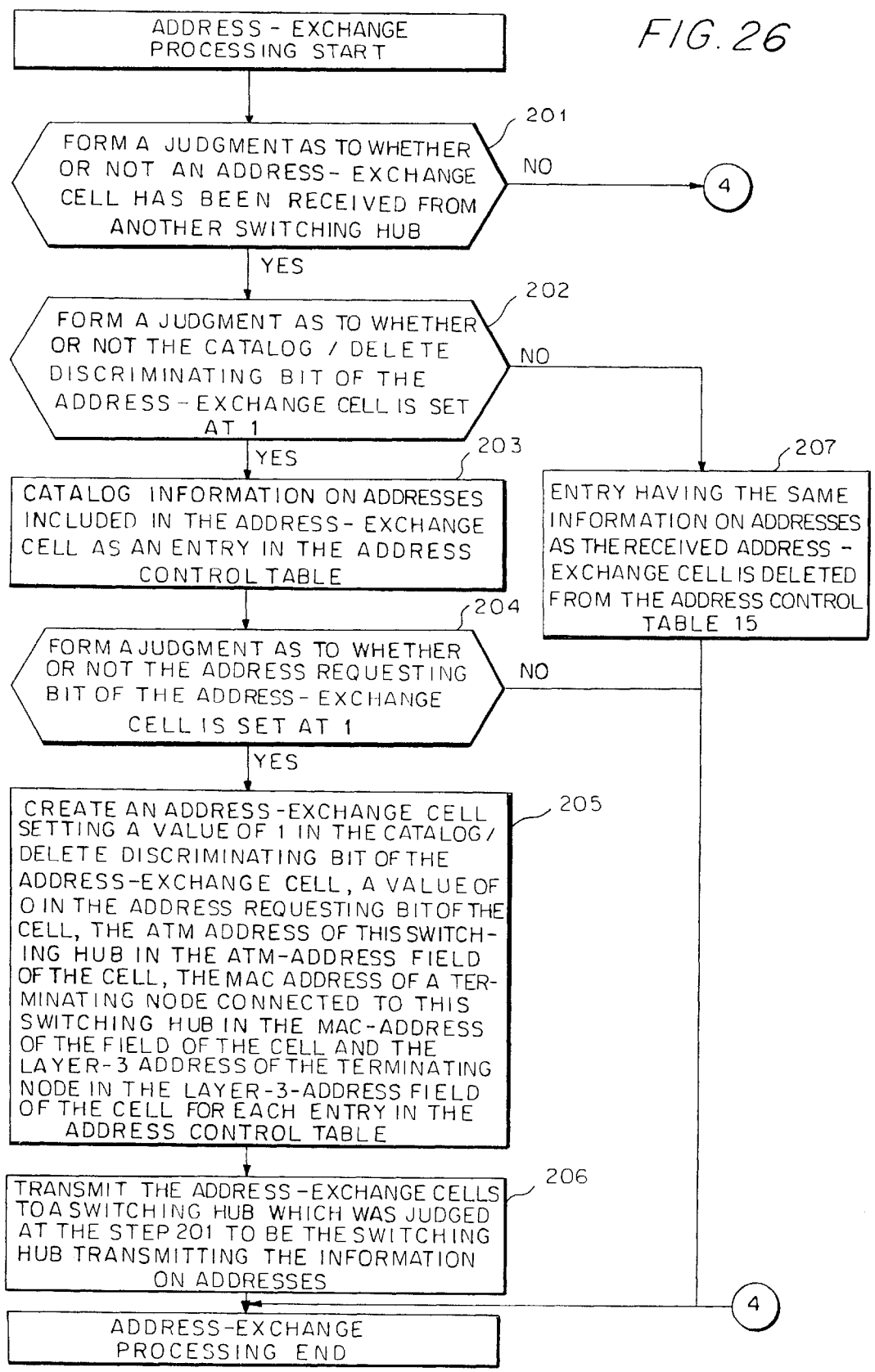
FIG. 26 is a flowchart illustrating a flow of processing carried out by execution of an address-exchange processing module provided by the other embodiment of the present invention.

FIG. 26 is a flowchart illustrating the flow of processing carried out by execution of the address-exchange processing module 17'. It should be noted that each of the steps of the flowchart could, for example, correspond to one or more instructions of a computer program executable by the CPU 11 to implement the address-exchange processing module 17. The computer program can, for example, be provided for installation in the storage unit 12 by a storage medium such as a floppy disk, CD ROM, etc. The computer program can also be provided by a network. The address-exchange processing module 17' is executed when new information on addresses is received from another switching HUB 10'. As shown in FIG. 26, the processing begins with a step 201 to form a judgment as to whether or not an address-exchange cell has been received from another switching HUB 10' through the cell transmitting/receiving port 14. If an address-exchange cell has been received from another switching HUB 10', that is, if the outcome of the judgment formed at the step 201 is YES, the flow of the processing goes on to a step 202 to form a judgment as to whether or not the catalog/delete discriminating bit of the address-exchange cell is set at 1. If the catalog/delete discriminating bit of the address-exchange cell is set at 1, that is, if the outcome of the judgment formed at the step 202 is YES, the flow of the processing goes on to a step 203 at which information on addresses included in the address-exchange cell is cataloged in the address control table 15 as an entry. At that time, the port number of the cell transmitting/receiving port 14 through which the address-exchange cell was received is recorded as the connection port 34 of the entry.

The flow of the processing then proceeds to a step 204 to form a judgment as to whether or not the address requesting bit of the address-exchange cell is set at 1. If the address requesting bit of the address-exchange cell is set at 1, that is, if the outcome of the judgment formed at the step 204 is YES, the flow of the processing goes on to a step 205 at which an address-exchange cell is created by setting a value of 1 in the catalog/delete discriminating bit of the address-exchange cell, a value of 0 in the address requesting bit of the cell, the ATM address of this switching HUB 10' in the ATM-address field of the cell, the MAC address of the of a terminating node 20 connected to this switching HUB 10' in the MAC-address of the field of the cell and the layer-3 address of the terminating node 20 in the layer-3-address field of the cell for each entry in the address control table 15. Then, the flow of the processing continues to a step 206 at which the address-exchange cells are transmitted to a switching HUB 10' which was judged at the step 201 to be the switching HUB 10' transmitting the information on addresses, and the address-exchange processing is ended.

It should be noted that, since a cell can include only information on addresses of 1 terminating node 20, as many exchange-address cells as terminating nodes 20 connected to this switching HUB 10' are created at the step 205 and transmitted at the step 206 by the address-exchange processing module 17'. If the address requesting bit of the address-exchange cell is not set at 1, that is, if the outcome of the judgment formed at the step 204 is NO, on the other hand, the address-exchange processing is ended. If the catalog/delete discriminating bit of the address-exchange cell is not set at 1, that is, if the outcome of the judgment formed at the step 202 is NO, on the other hand the flow of the processing goes on to a step 207 at which an entry having the same information on addresses as the received address-exchange cell is deleted from the address control table 15 and the address-exchange processing is ended. If an entry having the same information on addresses as the received address-exchange cell does not exist in the address control table 15, however, the address-exchange cell is simply discarded.

According to the embodiment described above, an entry for a terminating node 20 not responding to polling can be deleted from the address control table 15 of the switching HUB 10' in which the address-exchange module 17' is executed and from the address control table 15 of any other switching HUB 10'. Thus, the embodiment keeps up dynamically with disconnection of a terminating node 20 from a switching HUB 10' or migration of a terminating node 20 to another frame transmitting/receiving port 13 of the same switching HUB 10' or a frame transmitting/receiving port 13 of another switching HUB 10'. In addition, when a switching HUB 10' is started at a time the power supply thereof is turned on, information on addresses can be gathered from other switching HUBs 10' which have been started earlier.

Figure 27A:
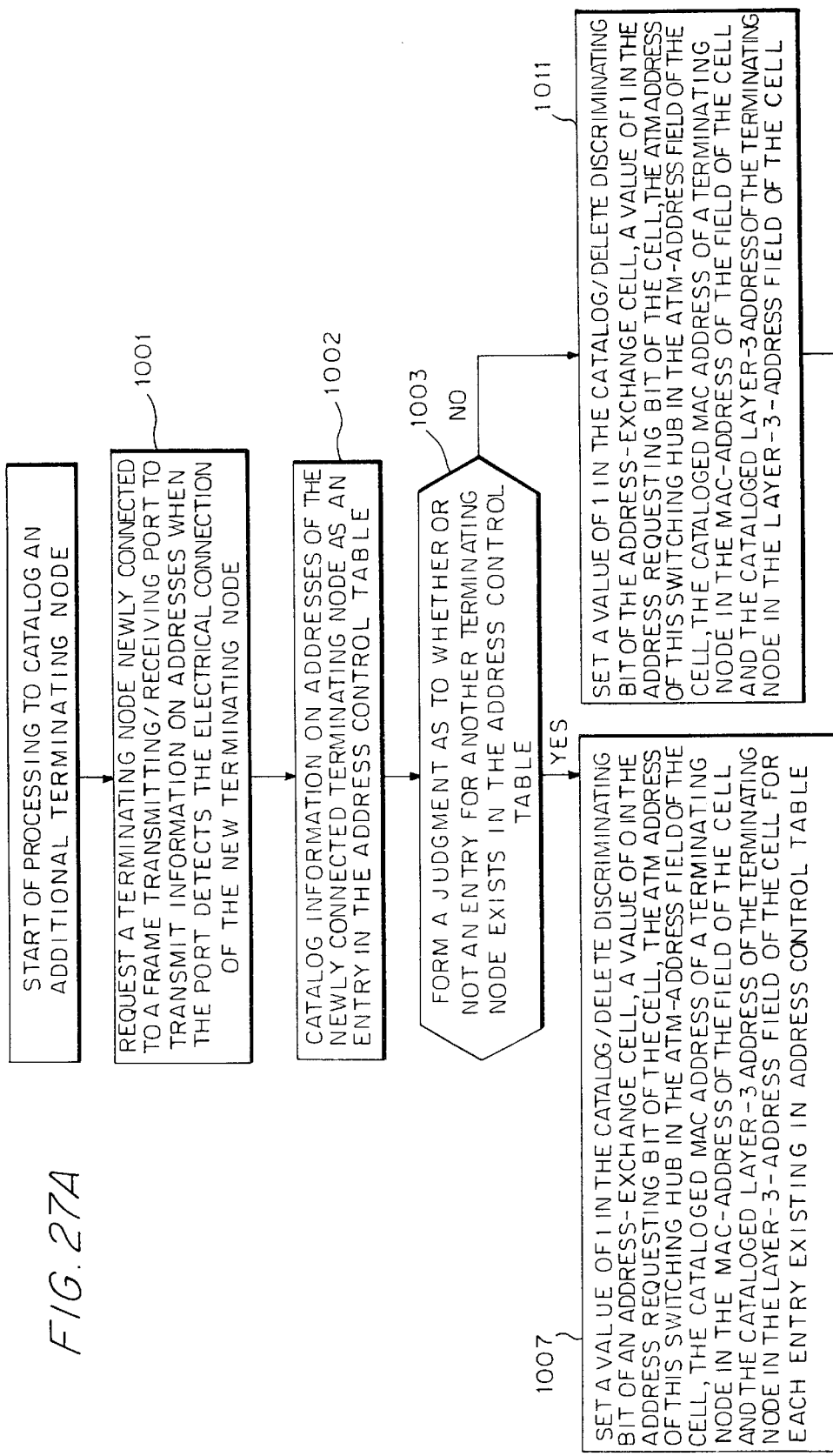
FIGS. 27A and B is a flowchart illustrating a flow of the processing to catalog an additional terminating node as an entry in an address control table of the terminal-cataloging processing module provided by a further other embodiment of the present invention.
Figure 27B:
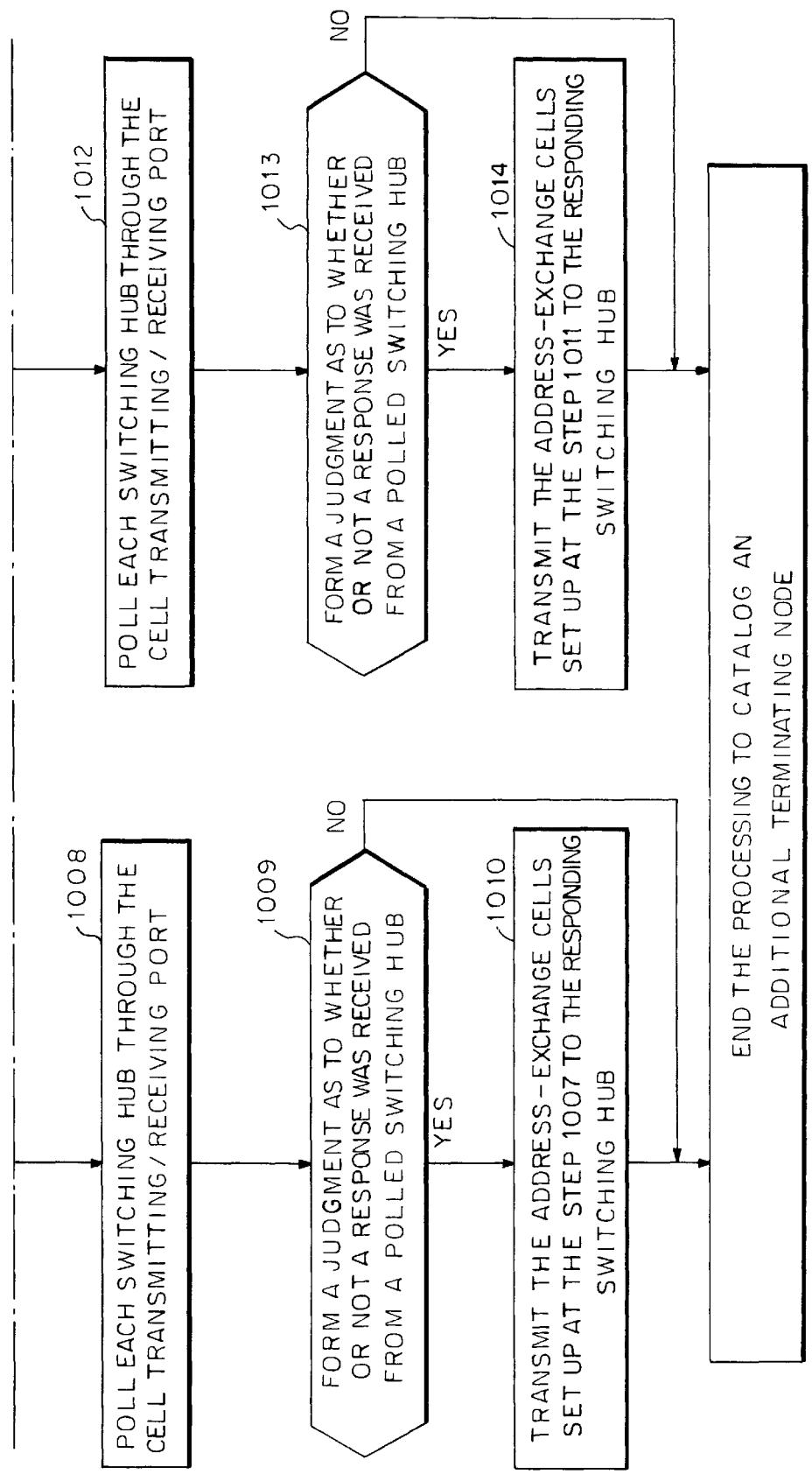
Figure 28:
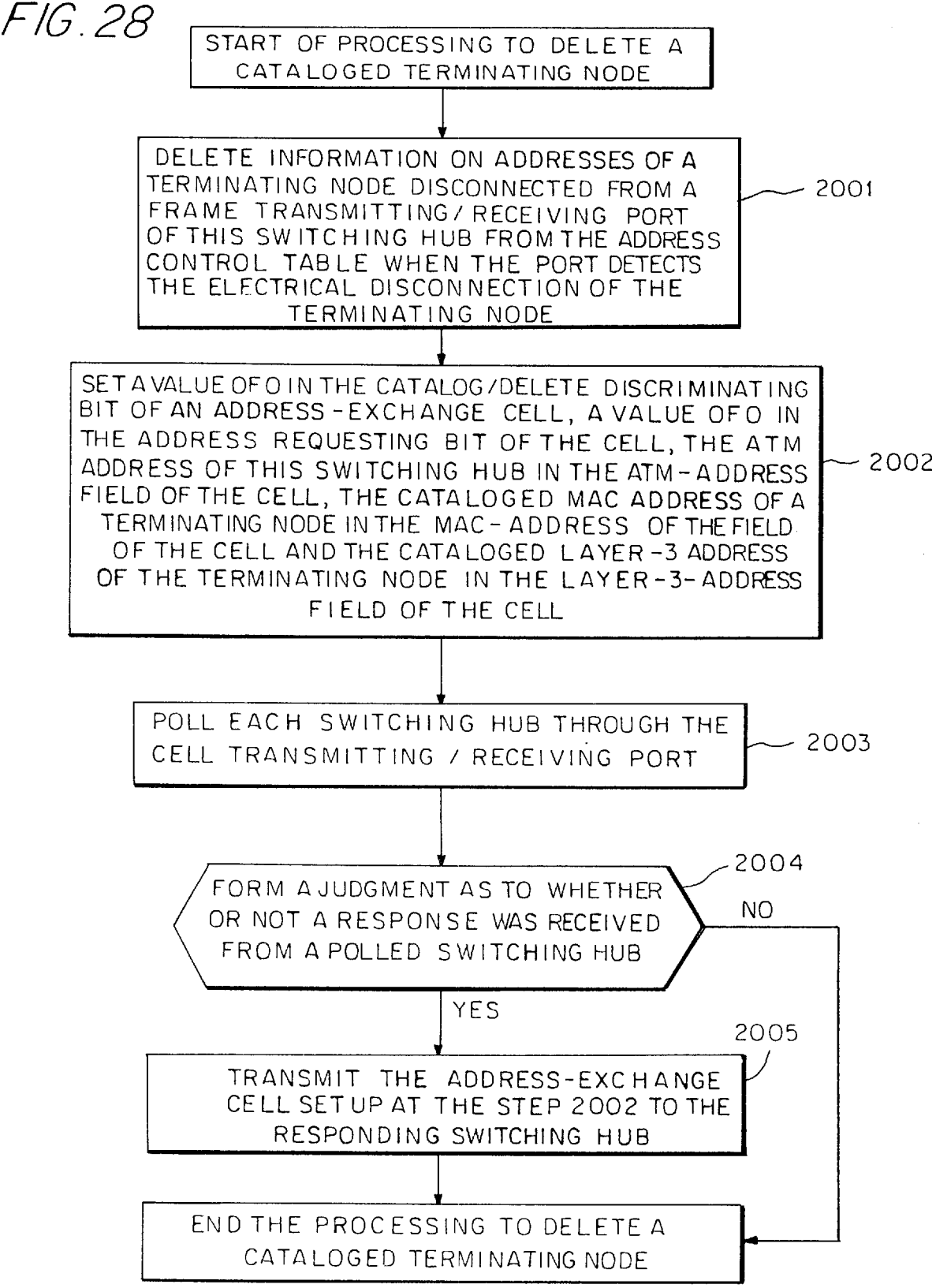
FIG. 28 is a flowchart illustrating a flow of the processing to delete an entry of a terminating node from an address control table of the terminal-cataloging processing module provided by the further other embodiment of the present invention.

FIGS. 27A and B and FIG. 28 are flowcharts illustrating the flow of processing carried out by execution of the terminal-cataloging processing module 16' as implemented by another embodiment of the present invention. It should be noted that each of the steps of the flowchart could, for example, correspond to one or more instructions of a computer program executable by the CPU 11 to implement the terminal-cataloging processing module 16. The computer program can, for example, be provided for installation in the storage unit 12 by a storage medium such as a floppy disk, CD ROM, etc. The computer program can also be provided by a network. The terminal-cataloging processing module 16' is executed to carry out processing to catalog an additional terminating node 20 as an entry in an address control table 15 or to delete a cataloged entry of a terminating node 20 from an address control table 15.

First of all, the flow of the processing to catalog an additional terminating node 20 as an entry in an address control table 15 is explained by referring to the flowchart illustrated in FIGS. 27A and B. As illustrated in FIGS. 27A and B, the processing to catalog an additional terminating node 20 begins with a step 1001 at which a terminating node 20 newly connected to a frame transmitting/receiving port 13 of this switching HUB 10' is requested to transmit information on addresses when the frame transmitting/receiving port 13 detects the electrical connection of the new terminating node 20 thereto. The flow of the processing then goes on to a step 1002 to catalog the MAC address and the layer-3 address of the newly connected terminating node 20 as well as the number of the frame transmitting/receiving port 13 to which the new terminating node 20 is connected as an entry of the address control table 15 in the fields of the data item 32 and the data item 33 as well as the connection port 34 of the entry respectively. If an entry having the same MAC address as the new terminating node 20 has already been cataloged in the address control table 15, the entry is updated to the received information on addresses.

Then, the flow of the processing proceeds to a step 1003 to form a judgment as to whether or not an entry for another terminating node 20 exists in the address control table 15. If an entry for another terminating node 20 exists in the address control table 15, that is, if the outcome of the judgment formed at the step 1003 is YES, the flow of the processing continues to a step 1007 to set a value of 1 in the catalog/delete discriminating bit of an address-exchange cell, a value of 0 in the address requesting bit of the cell, the ATM address of this switching HUB 10' in the ATM-address field of the cell, the cataloged MAC address of a terminating node 20 in the MAC-address of the field of the cell and the cataloged layer-3 address of the terminating node 20 in the layer-3-address field of the cell for each entry existing in the address control table 15. The flow of the processing then goes on to a step 1008 to poll each switching HUB 10' through the cell transmitting/receiving port 14 and the ATM-switch network 24.

Then, the flow of the processing proceeds to a step 1009 to form a judgment as to whether or not a response was received from a polled switching HUB 10'. If a response was received from a polled switching HUB 10', that is, if the outcome of the judgment formed at the step 1009 is YES, the flow of the processing continues to a step 1010 to transmit the address-exchange cells set up at the step 1007 to the responding switching HUB 10' and the processing to catalog the new terminating node 20 is ended. If no response was received from a polled switching HUB 10', that is, if the outcome of the judgment formed at the step 1009 is NO, on the other hand, the processing to catalog the new terminating node 20 is simply ended.

If an entry for another terminating node 20 does not exist in the address control table 15, that is, if the outcome of the judgment formed at the step 1003 is NO, on the other hand, the address control table 15 is considered to be in an empty state, a state which is seen for example when the power supply of the switching HUB 10' is turned on. In this case, the flow of the processing continues to a step 1011 to set a value of 1 in the catalog/delete discriminating bit of the address-exchange cell, a value of 1 in the address requesting bit of the cell, the ATM address of this switching HUB 10' in the ATM-address field of the cell, the cataloged MAC address of the of a terminating node 20 in the MAC-address of the field of the cell and the cataloged layer-3 address of the terminating node 20 in the layer-3-address field of the cell.

The flow of the processing then goes on to a step 1012 to poll each switching HUB 10' through the cell transmitting/receiving port 14 and the ATM-switch network 24. Then, the flow of the processing proceeds to a step 1013 to form a judgment as to whether or not a response was received from a polled switching HUB 10'. If a response was received from a polled switching HUB 10', that is, if the outcome of the judgment formed at the step 1013 is YES, the flow of the processing continues to a step 1014 to transmit the address-exchange cell set up at the step 1011 to the responding switching HUB 10' and the processing to catalog the new terminating node 20 is ended. If no response was received from a polled switching HUB 10', that is, if the outcome of the judgment formed at the step 1013 is NO, on the other hand, the processing to catalog the new terminating node 20 is simply ended.

Next, the processing to delete a cataloged entry of a terminating node 20 from the terminating node control table 15 is explained by referring to the flowchart illustrated in FIG. 28. As illustrated in the figure, the processing to delete an entry of a terminating node 20 begins with a step 2001 at which information on addresses of a terminating node 20 disconnected from a frame transmitting/receiving port 13 of this switching HUB 10' is deleted from the address control table 15 when the frame transmitting/receiving port 13 detects a change from a state of the terminating node 20 of being electrically connected to the frame transmitting/receiving port 13 to a state of the terminating node 20 of being electrically disconnected from the frame transmitting/receiving port 13. Then, the flow of the processing continues to a step 2002 to set a value of 0 in the catalog/delete discriminating bit of an address-exchange cell, a value of 0 in the address requesting bit of the cell, the ATM address of this switching HUB 10' in the ATM-address field of the cell, the cataloged MAC address of the of a terminating node 20 in the MAC-address of the field of the cell and the cataloged layer-3 address of the terminating node 20 in the layer-3-address field of the cell.

The flow of the processing then goes on to a step 2003 to poll each switching HUB 10' through the cell transmitting/receiving port 14 and the ATM-switch network 24. Then, the flow of the processing proceeds to a step 2004 to form a judgment as to whether or not a response was received from a polled switching HUB 10'. If a response was received from a polled switching HUB 10', that is, if the outcome of the judgment formed at the step 2004 is YES, the flow of the processing continues to a step 2005 to transmit the address-exchange cell set up at the step 2002 to the responding switching HUB 10' and the processing to catalog the new terminating node 20 is ended. If no response was received from a polled switching HUB 10', that is, if the outcome of the judgment formed at the step 2004 is NO, on the other hand, the processing to catalog the new terminating node 20 is simply ended.

Figure 29:
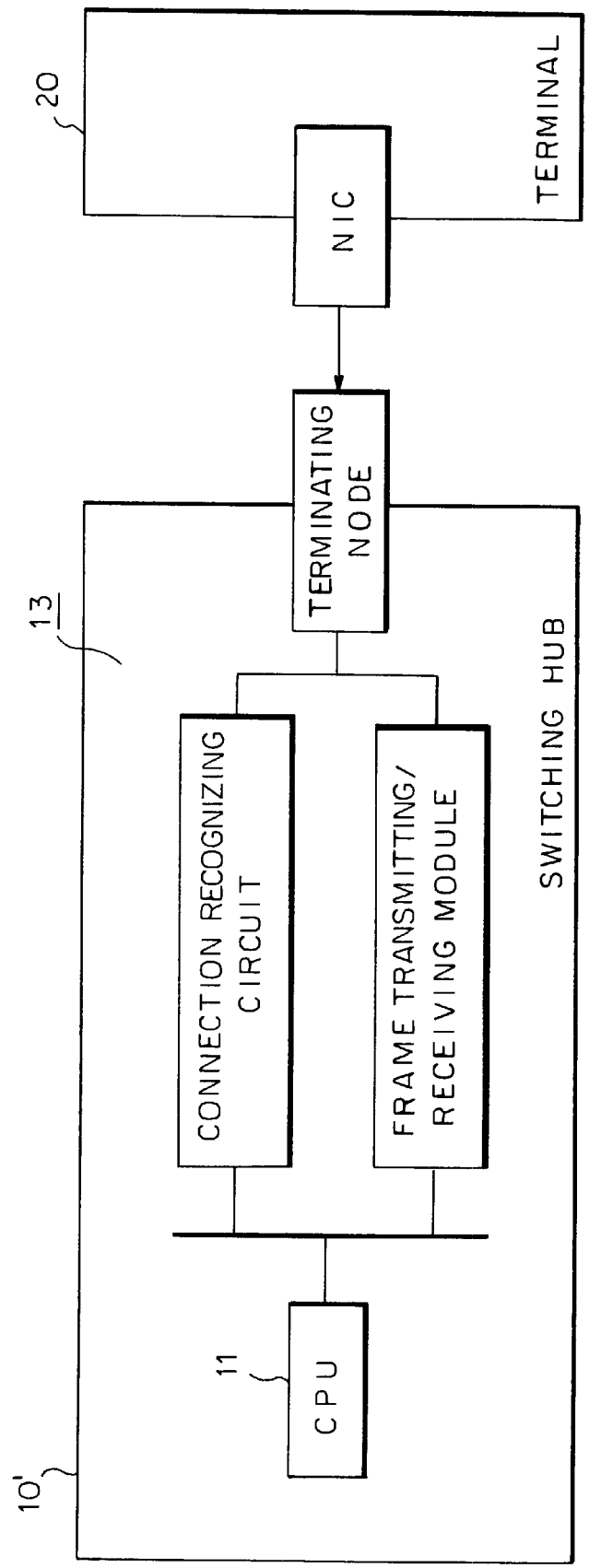
FIG. 29 is a diagram illustrating a typical detection of electrical connection and electrical disconnection of a terminating node to and from a frame transmitting/receiving port of a switching HUB of the present invention.

Next, typical detection of electrical connection and electrical disconnection of a terminating node 20 to and from a frame transmitting/receiving port 13 of a switching HUB 10' is explained by referring to FIG. 29. When a terminating node 20 is electrically connected to a frame transmitting/receiving port 13, an Network Interface Card (NIC) employed in the terminating node 20 starts transmission of a heart beat signal to the frame transmitting/receiving port 13. As a connection recognizing circuit employed in the switching HUB 10' detects this heart beat signal, an interrupt is output to the CPU 11. Receiving the interrupt, the CPU 11 starts the processing to newly catalog the terminating node 20 as an entry in the address control table 15. On the other hand, when the connection recognizing circuit employed in the switching HUB 10' does not detect this heart beat signal from the terminating node 20 any more, another interrupt is output to the CPU 11. Receiving the other interrupt, the CPU 11 starts the processing to delete the cataloged entry of the additional terminating node 20 from the address control table 15.

According to the other embodiment illustrated in FIGS. 27A and B to FIG. 29, the terminal-cataloging processing module 16' is capable of detecting electrical disconnection of a terminating node 20 from the switching HUB 10' in which the terminal-cataloging processing module 16' is executed without polling terminating nodes 20 connected to the switching HUB 10', allowing the amount of the overhead of the CPU 11 to be reduced. In addition, an entry of a terminating node 20 can be cataloged or deleted into or from the address control table 15 in a real-time manner upon detection of electrical connection and disconnection of the terminating node 20 to and from the switching HUB 10' independently of the length of polling interval.

As described above, according to the present invention, since a transmission apparatus such as a switching HUB provided between a terminating node and an ATM-switch network resolves an ATM address, a cost effective and highly reliable network system can be constructed without the need to install a server for resolving an address. In addition, since this transmission apparatus is capable of preventing a software overhead from being incurred in resolving an address, high performance can be displayed in comparison with an ATM client of the conventional IP-over-ATM system.

While the present invention has been described in detail and pictorially in the accompanying drawings, it is not limited to such details since many changes and modification recognizable to these of ordinary skill in the art having the benefit of this invention may be made to the invention without departing from the spirit and scope of the invention, and all such modifications as would be obvious to one skilled in the art and/or which become possible as technology develops, are intended to be included within the scope of the following claims.

We claim:

1. A transmission apparatus used for resolving an ATM address and provided between a terminating node communicating with another terminating node by using a layer-3 address and an ATM-switch network, said transmission apparatus comprising:

a first apparatus which receives an ATM address of another transmission apparatus and a layer-3 address of a terminating node connected to said another transmission apparatus from said another transmission apparatus, and catalogs said ATM address of said another transmission apparatus and said layer-3 address of said terminating node connected to said another transmission apparatus into a table; and a second apparatus which searches said table using a layer-3 address of a destination terminating node connected to said another transmission apparatus, said destination terminating node being a destination of data received from a terminating node connected to said transmission apparatus, to acquire an ATM address of said another transmission apparatus connected to said destination terminating node, and communicates with said another transmission apparatus using the acquired ATM address to transmit a cell including information of a layer-3 address of said destination terminating node.

2. A transmission apparatus according to claim 1, further comprising:

a third apparatus which receives a layer-3 address and a layer-2 address of a terminating node connected to said transmission apparatus from said terminating node connected to said transmission apparatus, and catalogs said layer-3 address and said layer-2 address of said terminating node connected to said transmission apparatus into said table; and a fourth apparatus which searches said table using a layer-3 address of a destination terminating node connected to said transmission apparatus, said destination terminating node being a destination of data received from a terminating node connected to another transmission apparatus through said ATM-switch network, to acquire a layer-2 address of said destination terminating node connected to said transmission apparatus, and transmits said received data including information of the layer-3 address to said destination terminating node connected to said transmission apparatus having the acquired layer-2 address.

3. A network system which includes an ATM-switch network, terminating nodes communicating with each other by using a layer-3 address, and a network including a plurality transmission apparatuses which are provided between said terminating nodes and said ATM-switch network, said transmission apparatuses communicate with said terminating nodes using a layer-2 address, communicate with each other through said ATM-switch network using an ATM address, and resolve an ATM address when communicating between said terminating nodes, each of said transmission apparatuses comprising:

a first apparatus which receives an ATM address of another transmission apparatus and a layer-3 address of a terminating node connected to said another transmission apparatus from said another transmission apparatus, and catalogs said ATM address of said another transmission apparatus and said layer-3 address of said terminating node connected to said another transmission apparatus into a table; and a second apparatus which searches said table using a layer-3 address of a destination terminating node connected to said another transmission apparatus, said destination terminating node being a destination of data received from a terminating node connected to said transmission apparatus, to acquire an ATM address of said another transmission apparatus connected to said destination terminating node, and communicates with said another transmission apparatus using the acquired ATM address to transmit a cell including information of said layer-3 address of said destination terminating node connected to said another transmission apparatus.

4. A transmission apparatus used for resolving an ATM address and provided between a terminating node communicating with another terminating node using a layer-3 address and an ATM-switch network, said transmission apparatus comprising:

a first apparatus which receives a layer-3 address of a terminating node connected to said transmission apparatus from said terminating node connected to said apparatus, catalogs said layer-3 address of said transmitting node connected to said transmission apparatus into a table, and transmits said layer-3 address and an ATM address of said transmission apparatus to another transmission apparatus;

a second apparatus which receives an ATM address of another transmission apparatus and a layer-3 address of a terminating node connected to said another transmission apparatus from said another transmission apparatus, and catalogs said ATM address of said another transmission apparatus and said layer-3 address of said terminating node connected to said another transmission apparatus into said table; and a third apparatus which searches said table using a layer-3 address of a destination terminating node connected to said another transmission apparatus, said destination terminating node connected to said another transmission apparatus being a destination of data received from a terminating node connected to said transmission apparatus, to acquire an ATM address of said another transmission apparatus connected to said destination terminating node, and communicates with said another transmission apparatus using the acquired ATM address to transmit a cell including information of said layer-3 address of said destination terminating node connected to said another transmission apparatus.

5. A transmission apparatus according to claim 4, further comprising:
a fourth apparatus which searches said table using a layer-3 address of a destination terminating node connected to said transmission apparatus, said terminating node connected to said transmission apparatus being a destination of data received from a terminating node connected to another transmission apparatus through said ATM-switch network, to acquire a layer-3 address of said destination terminating node connected to said transmission apparatus, and transmits the received data including information on said layer-3 address to said destination terminating node connected to said transmission apparatus.

6. A transmission apparatus according to claim 4, further comprising:
a fourth apparatus which polls terminating nodes connected to said transmission apparatus, deletes a layer-3 address of a polled terminating node which did not respond to said transmission apparatus from said table, and requests said another transmission apparatus to delete said layer-3 address of said polled terminating node which did not respond to said transmission apparatus from a similar table of said another transmission apparatus.

7. A transmission apparatus according to claim 4, further comprising:
a fourth apparatus which receives a layer-3 address of a terminating node connected to said transmission apparatus when said terminating node is electrically connected to said transmission apparatus; and
a fifth apparatus which deletes a layer-3 address of a terminating node connected to said transmission apparatus from said table when said terminating node is electrically disconnected from said transmission apparatus and requests said another transmission apparatus to delete said layer-3 address of the electrically disconnected terminating node from a similar table of said another transmission apparatus.

8. A method of resolving an ATM address between a terminating node communicating with another terminating node using a level-3 address and an ATM-switch network, said method comprising:
receiving an ATM address of another transmission apparatus and a layer-3 address of a terminating node connected to said another transmission apparatus from said another transmission apparatus;
cataloging said ATM address of said another transmission apparatus and said layer-3 address of said transmitting node connected to said another transmission apparatus into a table;
searching said table using a layer-3 address of a destination terminating node connected to said another transmission apparatus, said destination terminating node being a destination of data received from a terminating node connected to a transmission apparatus, to acquire an ATM address of said another transmission apparatus connected to said destination terminating node; and
communicating with said another transmission apparatus using the acquired ATM address to transmit a cell including information of a layer-3 address of said destination terminating node.

9. A method according to claim 8, further comprising:
receiving a layer-3 address and a layer-2 address of a terminating node connected to said transmission apparatus from said terminating node connected to said transmission apparatus;
cataloging said layer-3 address and said layer-2 address of said transmitting node connected to said transmission apparatus into said table;
searching said table using a layer-3 address of a destination terminating connected to said transmission apparatus, said destination terminating node being a destination node of data received from a terminating node connected to another transmission apparatus through said ATM-switch network, to acquire a layer-2 address of said destination terminating node connected to said transmission apparatus; and
transmitting the received data including information of said layer-3 address to said destination terminating node connected to said transmission apparatus having the acquired layer-2 address.

10. A method, in a network system including an ATM-switch network, terminating nodes communicating with each other by using a layer-3 address, and a network including said terminating nodes and said ATM-switch network, of communicating with said terminating nodes using a layer-2 address, communicating through said ATM-switch network using an ATM address, and resolving said ATM address when communicating between said terminating nodes, said method comprising:
receiving an ATM address of another transmission apparatus and a layer-3 address of a terminating node connected to said another transmission apparatus from said another transmission apparatus;
cataloging said ATM address of said another transmission apparatus and said layer-3 address of said terminating node connected to said another transmission apparatus into a table;
searching said table using a layer-3 address of a destination terminating node connected to said another transmission apparatus, said destination terminating node being a destination of data received from a terminating node connected to a transmission apparatus, to acquire an ATM address of another transmission apparatus connected to said destination terminating node; and
communicating with said another transmission apparatus using the acquired ATM address to transmit a cell including information of said layer-3 address of said destination terminating node connected to said another transmission apparatus.

11. A method of resolving an ATM address between a terminating node communicating with another terminating node using a level-3 address and an ATM-switch network, said method comprising:
receiving a layer-3 address of a terminating node connected to a transmission apparatus from said terminating node connected to said transmission apparatus;

cataloging said layer-3 address of said transmitting node connected to said transmission apparatus into a table;

transmitting said layer-3 address of said transmitting node connected to said transmission apparatus and an ATM address of said transmission apparatus to another transmission apparatus;

receiving an ATM address of another transmission apparatus and a layer-3 address of a terminating node connected to said another transmission apparatus from said another transmission apparatus;

cataloging said ATM address of said another transmission apparatus and said layer-3 address of said terminating node connected to said another transmission apparatus into said table;

searching said table using a layer-3 address of a destination terminating node connected to said another transmission apparatus, said destination terminating node connected to said another transmission apparatus being a destination of data from a terminating node connected to said transmission apparatus, to acquire an ATM address of said another transmission apparatus connected to said destination terminating node; and communicating with said another transmission apparatus using the acquired ATM address to transmit a cell including information of said layer-3 address of said destination terminating node connected to said another transmission apparatus.

12. A method according to claim 11, further comprising:

searching said table using a layer-3 address of a destination terminating node connected to said transmission apparatus, said terminating node connected to said transmission apparatus being a destination of data received from a terminating node connected to another transmission apparatus through said ATM-switch network, to acquire a layer-3 address of said destination terminating node connected to said transmission apparatus; and transmitting the received data including information on said layer-3 address to said destination terminating node connected to said transmission apparatus.

13. A method according to claim 12, further comprising:

polling terminating nodes connected to said transmission apparatus;

deleting a layer-3 address of a polled terminating node which did not respond to said transmission apparatus from said table; and requesting said another transmission apparatus to delete said layer-3 address of said polled terminating node which did not respond to said transmission apparatus from a similar table of said another transmission apparatus.

14. A method according to claim 11, further comprising:

receiving a layer-3 address of a terminating node connected to said transmission apparatus when said terminating node is electrically connected to said transmission apparatus;

deleting a layer-3 address of a terminating node connected to said transmission apparatus from said table said terminating node is electrically disconnected from said transmission apparatus; and requesting said another transmission apparatus to delete said layer-3 address of the electrically disconnected terminating node from a similar table of said another transmission apparatus.

15. A transmission apparatus for resolving an ATM address between terminating nodes in an ATM-switch network, said transmission apparatus comprising:

a table which stores information of addresses of terminating nodes connected to said transmission apparatus and information indicating corresponding relations between an ATM address of another transmission apparatus and addresses of terminating nodes connected to said another transmission apparatus; and a first apparatus, in response to a request to transmit data from a terminating node connected to said transmission apparatus to a destination terminating node connected to another transmission apparatus, searches said table using an address of said destination terminating node connected to said another transmission apparatus to acquire an ATM address of said another transmission apparatus connected to said destination terminating node, and communicates with said another transmission apparatus using the acquired ATM address to transmit a cell to said destination terminating node connected to said another transmission apparatus including information of said address of said destination terminating node connected to said another transmission apparatus.

16. A transmission apparatus according to claim 15, further comprising:

a second apparatus, in response to a request for transmitting data from a terminating node connected to another transmission apparatus to a destination terminating node connected to said transmission apparatus, searches said table using an address of said destination terminating node connected to said transmission apparatus to acquire an address of said destination terminating node connected to said transmission apparatus, and transmits the received data to said destination terminating node connected to said transmission apparatus having the acquired address.

17. A transmission apparatus used for resolving an ATM address and provided between a terminating node communicating with another terminating node by using an address of a terminating node and an ATM-switch network, said transmission apparatus comprising:

a table which stores information of addresses of terminating nodes connected to said transmission apparatus and information indicating corresponding relations between an ATM address of another transmission apparatus and addresses of terminating nodes connected to said another transmission apparatus;

a first apparatus, in response to a request to transmit data from a terminating node connected to said transmission apparatus to a destination terminating node connected to another transmission apparatus, searches said table using an address of said destination terminating node connected to said another transmission apparatus to acquire an ATM address of said another transmission apparatus connected to said destination terminating node, and communicates with said another transmission apparatus using the acquired ATM address to transmit a cell to said destination terminating node connected to said another transmission apparatus including information of said address of said destination terminating node of said another transmission apparatus; and a second apparatus, in response to a request for transmitting data from a terminating node connected to said another transmission apparatus to a destination terminating node connected to said transmission apparatus, searches said table using an address of said destination terminating node connected to said transmission apparatus to acquire an address of said destination terminating node connected to said transmission apparatus, and transmits the received data to said terminating node connected to said another transmission apparatus having the acquired address.

18. A transmission apparatus according to claim 17, further comprising:
a third apparatus which polls terminating nodes connected to said transmission apparatus, deletes an address of a polled terminating node which did not respond to said transmission apparatus from said table, and requests another transmission apparatus to delete said address of said polled terminating node which did not respond to said transmission apparatus from a similar table of said another transmission apparatus.

19. A transmission apparatus according to claim 17, further comprising:
a third apparatus which receives an address of a terminating node connected to said transmission apparatus when said terminating node is electrically connected to said transmission apparatus; and
a fourth apparatus which deletes an address of a terminating node connected to said transmission apparatus from said table when said terminating node is electrically disconnected from said transmission apparatus and requests another transmission apparatus to delete said address of the electrically disconnected terminating node from a similar table of said another transmission apparatus.

20. A method of resolving an ATM address between terminating nodes in an ATM-switch network, said method comprising:
storing in a table information of addresses of terminating nodes connected to a transmission apparatus and information indicating corresponding relations between an ATM address of another transmission apparatus and addresses of terminating nodes connected to said another transmission apparatus;
in response to a request to transmit data from a terminating node connected to said transmission apparatus to a destination terminating node connected to another transmission apparatus, searching said table using an address of said destination terminating node of said another transmission apparatus to acquire an ATM address of said another transmission apparatus connected to said destination terminating node; and
communicating with said another transmission apparatus using the acquired ATM address to transmit a cell to said destination terminating node of said another transmission apparatus including information of said address of said destination terminating node of said another transmission apparatus.

21. A method according to claim 20, further comprising:
in response to a request for transmitting data from a terminating node connected to said another transmission apparatus to a destination terminating node connected to said transmission apparatus, searching said table using an address of said destination terminating node connected to said transmission apparatus to acquire an address of said destination terminating node connected to said transmission apparatus; and
transmitting the received data to said destination terminating node connected to said transmission apparatus having the acquired address.

22. A method of resolving an ATM address and provided between a terminating node communicating with another terminating node using an address of the terminating node and an ATM-switch network, said method comprising:
storing in a table information of addresses of terminating nodes connected to said transmission apparatus and information indicating corresponding relations between an ATM address of another transmission apparatus and addresses of terminating nodes connected to said another transmission apparatus;
in response to a request to transmit data from a terminating node connected to said transmission apparatus to a destination terminating node connected to another transmission apparatus, searching said table using an address of said destination terminating node connected to said another transmission apparatus to acquire an ATM address of said another transmission apparatus connected to said destination terminating node;
communicating with said another transmission apparatus using the acquired ATM address to transmit a cell to said destination terminating node connected to said another transmission apparatus including information of said address of said destination terminating node of said another transmission apparatus;
in response to a request for transmitting data from a terminating node connected to said another transmission apparatus to a destination terminating node connected to said transmission apparatus, searching said table using an address of said destination terminating node connected to said transmission apparatus to acquire an address of said destination terminating node of connected to said transmission apparatus; and
transmitting the received data to said terminating node connected to said transmission apparatus having the acquired address.

23. A method according to claim 22, further comprising:
polling terminating nodes connected to said transmission apparatus;
deleting an address of a polled terminating node which did not respond to said transmission apparatus from said table; and
requesting another transmission apparatus to delete said address of said polled terminating node which did not respond to said transmission apparatus from a similar table of said another transmission apparatus.

24. A method according to claim 22, further comprising:
receiving an address of a terminating node connected to said transmission apparatus when said terminating node is electrically connected to said transmission apparatus;
deleting an address of a terminating node connected to said transmission apparatus from said table when said terminating node is electrically disconnected from said transmission apparatus; and
requesting another transmission apparatus to delete said address of the electrically disconnected terminating node from a similar table of said another transmission apparatus.

25. A method of communicating between terminating nodes in an ATM-switch network, said method comprising:
sending, from a source terminating node connected to a transmission apparatus, a request for transmitting data from said source terminating node connected to said transmission apparatus to a destination terminating node connected to another transmission apparatus;
processing said request from said source terminating node connected to said transmission apparatus to resolve an ATM address of said another transmission apparatus connected to said destination terminating node; and communicating with said another transmission apparatus using said ATM address to transmit a cell corresponding to said data from said source terminating node connected to said transmission apparatus to said destination terminating node connected to said another transmission apparatus.

26. A method according to claim 25, further comprising:

sending, from a source terminating node connected to said another transmission apparatus, a request for transmitting data from said source terminating node connected to said another transmission apparatus to a destination terminating node connected to said transmission apparatus;

processing said request from said source terminating node connected to said another transmission apparatus to resolve an ATM address of said transmission apparatus connected to said destination terminating node connected to said transmission apparatus; and transmitting a cell corresponding to said data from said source terminating node connected to said another transmission apparatus to said destination terminating node connected to said transmission apparatus using said ATM address.

27. A method according claim 26, further comprising:

polling terminating nodes connected to said transmission apparatus;

identifying an address of a polled terminating node connected to said transmission apparatus that did not respond to the poll; and identifying to said another transmission apparatus said address of the poll terminating node connected to said transmission apparatus that did not respond to the poll.

28. A method according to claim 25, further comprising:

identifying to said transmission apparatus an address of a terminating node connected to said transmission apparatus that has been electrically connected to said transmission apparatus;

identifying to said transmission apparatus an address of a terminating node connected to said transmission apparatus that has been electrically disconnected from said transmission apparatus; and identifying to said another transmission apparatus said address of said terminating node that has been electrically disconnected from said transmission apparatus.

* * * * *